(12) United States Patent
Ohba

(10) Patent No.: US 7,310,098 B2
(45) Date of Patent: Dec. 18, 2007

(54) METHOD AND APPARATUS FOR RENDERING THREE-DIMENSIONAL OBJECT GROUPS

(75) Inventor: Akio Ohba, Kanagawa (JP)

(73) Assignee: Sony Computer Entertainment Inc., Tokyo (JP)

( * ) Notice: Subject to any disclaimer, the term of this patent is extended or adjusted under 35 U.S.C. 154(b) by 273 days.

(21) Appl. No.: 10/653,791

(22) Filed: Sep. 2, 2003

(65) Prior Publication Data

US 2004/0066384 A1    Apr. 8, 2004

(30) Foreign Application Priority Data

| Sep. 6, 2002 | (JP) | ............................. 2002-262170 |
| Apr. 28, 2003 | (JP) | ............................. 2003-124477 |
| Aug. 15, 2003 | (JP) | ............................. 2003-293804 |

(51) Int. Cl.
  *G06T 15/70* (2006.01)
  *G06T 15/40* (2006.01)
  *G09G 5/00* (2006.01)

(52) U.S. Cl. ....................... 345/428; 345/421; 345/629

(58) Field of Classification Search ................. 345/419
See application file for complete search history.

(56) References Cited

U.S. PATENT DOCUMENTS

| 5,757,385 | A | * | 5/1998 | Narayanaswami et al. .. 345/505 |
| 5,867,166 | A | * | 2/1999 | Myhrvold et al. .......... 345/419 |
| 5,986,659 | A | * | 11/1999 | Gallery et al. ............. 345/419 |
| 5,999,189 | A | * | 12/1999 | Kajiya et al. ............... 382/232 |
| 6,016,150 | A | * | 1/2000 | Lengyel et al. ............. 345/426 |
| 7,133,041 | B2 | * | 11/2006 | Kaufman et al. ........... 345/419 |
| 2002/0015055 | A1 | * | 2/2002 | Foran ........................ 345/679 |

FOREIGN PATENT DOCUMENTS

JP    2001-043393    2/2001

OTHER PUBLICATIONS

Kwan Liu Ma, James S. Painter, Charles D. Hansen, Michael F. Krogh, "A data distributed, parallel algorithm for ray-traced volume rendering," Oct. 25, 1993, Proceedings of the 1993 Symposium on Parallel Rendering, p. 15-22.*

(Continued)

*Primary Examiner*—Ulka Chauhan
*Assistant Examiner*—Jason M Repko
(74) *Attorney, Agent, or Firm*—Fitch, Even, Tabin & Flannery

(57) ABSTRACT

An image processing apparatus for performing rendering processing of three-dimensional objects is provided. An object storage unit stores the three-dimensional data of the object and the array data of B-box which encloses the spatial region which the object occupies. A grouping unit reads in the B-box array from the object storage unit, does grouping of multiple B-boxes into groups based on the object characteristics and level of detail information. A rendering processing unit derives a brick in which there are B-boxes belonging to the same group and generates image data by doing rendering processing independently by brick to be stored in an image storage unit. A consolidation unit consolidates the image data per brick stored in the image storage unit and generates the final output image data to be displayed.

30 Claims, 33 Drawing Sheets

OTHER PUBLICATIONS

Jerrell Watts, Stephen Taylor, "A practical approach to dynamic load balancing," Mar. 1998, IEEE Transactions on Parallel and Distributed Systems, v. 9 n. 3, p. 235-248.*

Jerrell Watts, Stephen Taylor, "A Practical Approach to Dynamic Load Balancing," Mar. 1998, IEEE Transactions on Parallel and Distributed Systems, vol. 9, No. 3, p. 235-248.*

Kwan Liu Ma, James S. Painter, Charles D. Hansen, Michael F. Krogh, "A Data Distributed, Parallel Algorithm for Ray-Traced Volume Rendering," Oct. 25, 1993, Proceedings of the 1993 Symposium on Parallel Rendering, p. 15-22.*

Kwan Liu Ma, James S. Painter, Charles D. Hansen, Michael F. Krogh, "A Data Distributed, Parallel Algorithm for Ray-Traced Volume Rendering," Oct. 25, 1993, Proceedings of the 1993 Symposium on Parallel Rendering, p. 15-22.*

European Patent Office, "Examination Report", dated Aug. 26, 2005, for the corresponding European Patent Application No. 03794128.3-1522, 9 pages.

Taiwanese Patent Office, "Notice of Rejection", dated Mar. 23, 2005, for the corresponding Taiwanese Patent Application No. 092124614, 9 pages.

Kwan- Liu Ma et al., "A Data Distributed, Parallel Algorithm for Ray-Traced Volume Rendering", Parallel Rendering Symposium, 1993 San Jose, CA, USA, Oct. 25-26, 1993, New York NY, USA, IEEE, Oct. 25, 1993, pp. 15-22, XP010222611, ISBN: 0-8186-4920-8.

Patent Cooperation Treaty, "International Search Report", dated Apr. 16, 2004, for corresponding international patent application No. PCT/JP 03/11005, 4 pages.

Torborg, Jay, et al., "Talisman: Commodity Realtime 3D Graphics for the PC," ACM SIGGRAPH, Conference Proceedings, Aug. 4-9, 1996, pp. 353-363.

Barkans, Anthony C., "High Quality Rendering Using the Talisman Architechture," Proceedings of the ACM SIGGRAPH/ EUROGRAPHICS workshop on Graphics hardware, Los Angeles, CA, Aug. 1997, pp. 79-88.

Tawain Patent Office, "Decision of Rejection", dated Nov. 1, 2005, for the corresponding Taiwanese Patent Application No. 092124614, 9 pages.

* cited by examiner

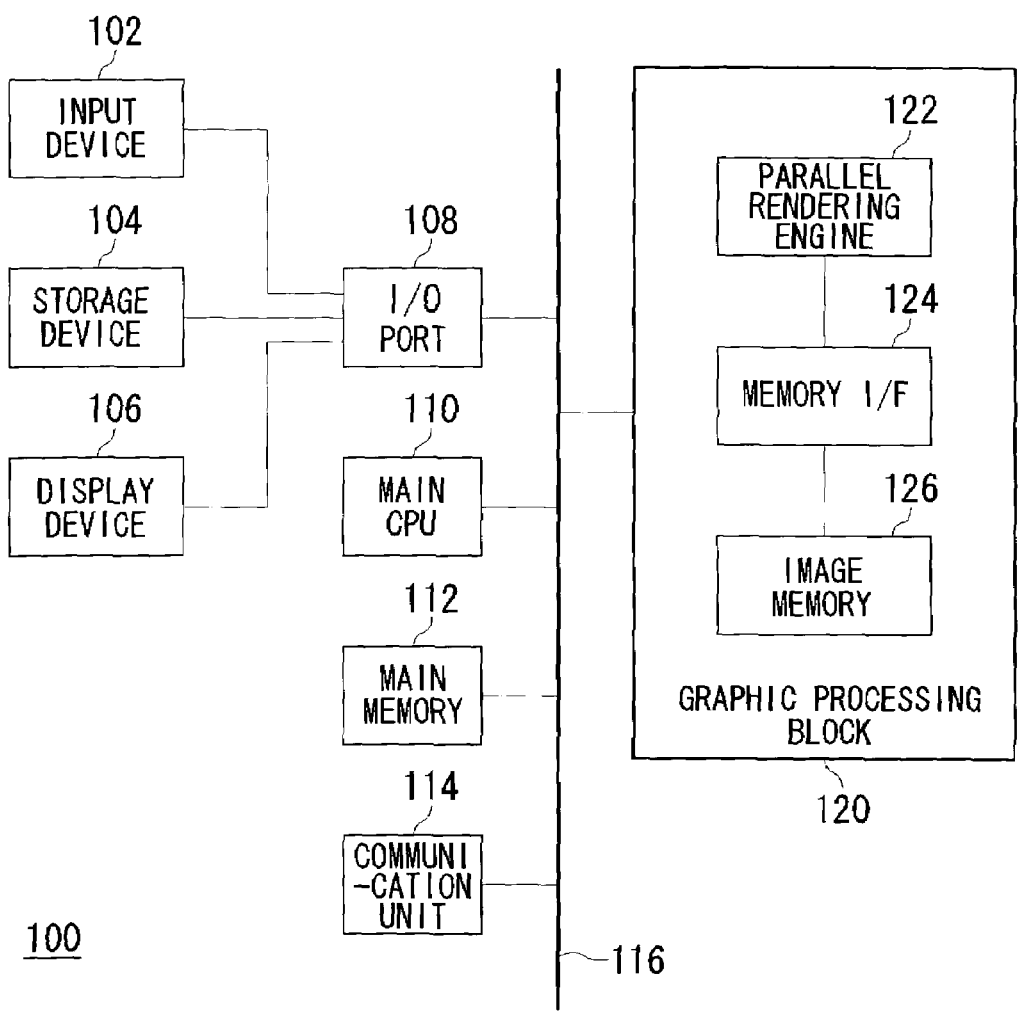

FIG.14

```
RP1 : GROUPS  A, D, G
RP2 : GROUP   B
RP3 : GROUPS  C, E
RP4 : GROUP   F
```

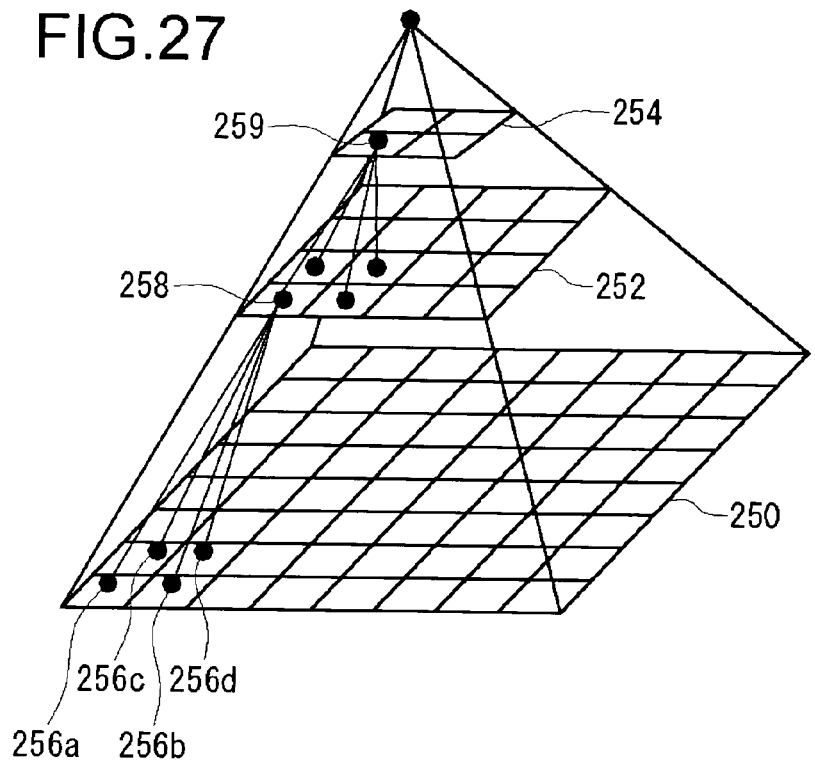

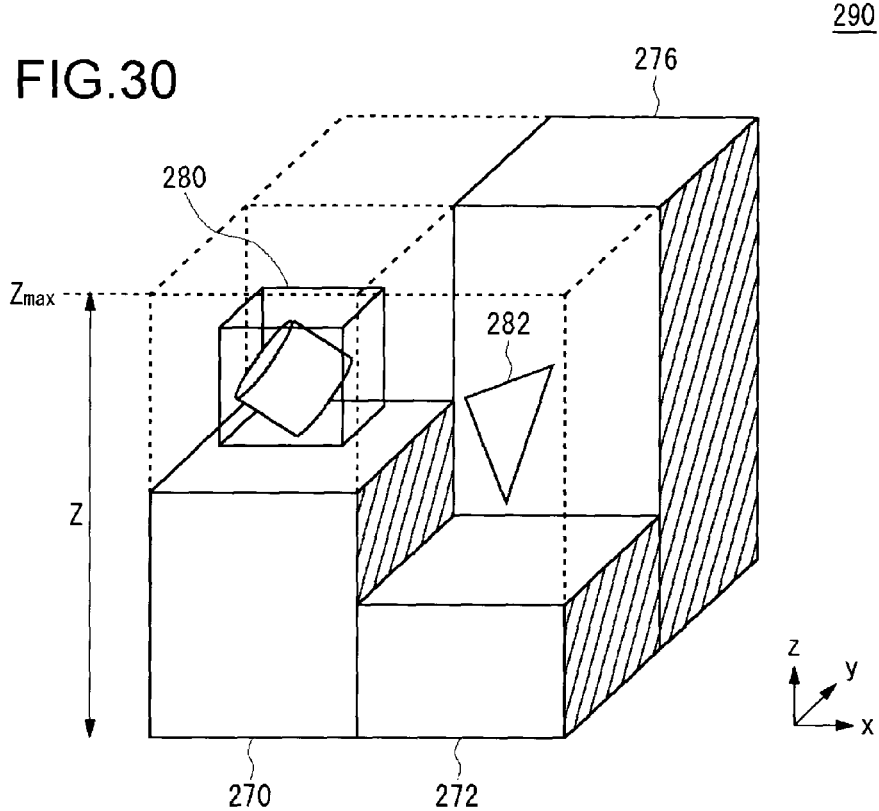

METHOD AND APPARATUS FOR RENDERING THREE-DIMENSIONAL OBJECT GROUPS

BACKGROUND OF THE INVENTION

1. Field of the Invention

The present invention relates to an image processing technology, and it particularly relates to image processing method and apparatus for rendering three-dimensional objects to be displayed on a two-dimensional screen.

2. Description of the Related Art

In applications such as computer games and simulations which use many 3-D graphics, since the viewpoint from which a user views a 3-D object moves and the user moves 3-D objects, high-speed computer graphic (CG) processing is required. To be specific, every time an object or viewpoint moves, it is necessary to do high-speed rendering processing. In this processing the world coordinate of an object is transformed into a two-dimensional coordinate through perspective transformation. Based on this positional information and the texture features of the object surface such as colors and patterns, the color information is determined by pixel unit through rendering processing, which is then written in the frame buffer memory to be displayed on the screen.

In order to achieve higher speed rendering processing, there is a division processing method, in which a region to be rendered is divided into small tile regions and rendering is done in parallel per tile. With this method, called tile rendering, it is possible to do the majority of processing on the on-chip memory so the degree of dependence on external memory used as frame buffer is minimal. As a result, compared to existing graphic chips using 3-D pipeline, memory bandwidth can be narrower.

Also, there is a method, in which multiple graphic processors are driven in parallel. Each processor has VRAM and the rendering data processed by the respective graphic processors and Z-buffer, are synchronized and then output and externally consolidated into an image.

Since tile rendering differs greatly from the 3-D pipeline processing method, there is a compatibility problem with applications, and when the number of objects increases its efficiency is reduced because of sort processing. In the method where graphic processors are driven in parallel, parallelism is higher, but, since it is configured to use physically separate memory, the utilization of VRAM is poor and flexibility of operation is difficult. There is also a method in which a space is divided into evenly sized standard view volumes and image processing is done in parallel by standard view volume unit. But, in this method, since the space is divided without giving consideration to the shape and spatial position of a 3-D object, it is difficult to devise a flexible and optimal rendering stratagem, which reflects characteristics of each object.

Thus, it is clear that realizing compatibility and flexibility while at the same time improving memory efficiency and computing efficiency through increasing parallelism of rendering processing is a difficult challenge.

SUMMARY OF THE INVENTION

The present invention has been made with a view to the above-mentioned problems, and an object thereof is to provide an image processing technology capable of flexibly handling diversified rendering stratagems and to achieve higher efficiency through parallel processing.

According to one aspect of the present invention, an image processing apparatus is provided. The apparatus comprises a grouping unit which groups input three-dimensional objects into groups; a rendering processing unit which derives a subspace which contains the three-dimensional objects belonging to the same group to be an independent rendering unit and performs rendering processing individually on the subspace, and generates independent image data for each subspace; and a consolidation unit which generates final output image data to be displayed by consolidating the image data generated for each subspace.

A 3-D object defined by a world coordinate system is clipped by a view volume, and projected on a two-dimensional projection plane by a projective method such as a parallel projection, perspective projection or the like, and then displayed. The view volume may be narrowed down to an appropriate finite region so that the number of the three-dimensional objects to be projected on the projection plane can be limited. A parallelepiped view volume can be attained by defining the depth in the projection direction on the view volume by parallel projection. On the other hand, a quadrangular truncated pyramid view volume can be attained by defining a direction from the viewpoint, angle, and depth on the view volume by perspective projection. The rendering processing unit may utilize such a quadrangular truncated pyramid view volume by perspective projection or a parallelepiped view volume by parallel projection as the subspace.

When a plurality of three-dimensional objects are grouped into some groups and the three-dimensional space is divided into the subspaces each of which contains the three-dimensional objects belonging to the same group, the subspaces can overlap one another, however, this kind of overlapping may be allowed. If the space is divided into evenly sized subspaces, the three-dimensional object can be split on the boundary of the subspaces and it becomes difficult to render the object over the boundary. Therefore, by dividing the space into unevenly sized subspaces which contains the three-dimensional objects belonging to the same group allowing overlapping, it becomes possible to adopt rendering stratagem independently by divided subspace unit. For instance, multi-resolution rendering becomes possible in which a resolution which varies by subspace is selected and defocus processing is performed. Furthermore, distributed rendering processing becomes easier since the rendering processing can be performed independently by subspace.

The grouping of the three-dimensional objects may be performed based on the object characteristics or information related to LOD (Level of Detail) in rendering the object. LOD information is a level indicating how precisely the object shall be rendered according to the distance from the viewpoint. The object characteristics and LOD information may be set up in advance at the stage of designing the object or may be manually set up by a user at the stage of rendering the object, or may be automatically set up by a rendering system.

The rendering processing unit may comprise a plurality of rendering units, and may distribute the rendering processing to the plurality of the rendering units according to complexity level of the rendering processing by subspace unit. The complexity level of the rendering processing indicates difficulty in the rendering processing in a broad sense, implying difference in the computational amount of various types of rendering algorithms applied to the object, difference in processing load on computational resources such as CPU and memory in executing the rendering algorithm, or the like. The plurality of the rendering units may be bus-connected, each of which has its dedicated memory area, and implemented on one chip as a parallel rendering engine which can generate image data in parallel. The plurality of the rendering units may be an assembly of external distributed processing units connected with each other via a network, which performs the rendering processing by subspace unit in a distributed manner.

The processing performance of the plurality of the rendering units may differ with respect to computing capability, memory capacity or the like and the rendering processing may be assigned to the rendering units, each of which has the appropriate processing performance corresponding to complexity level of the rendering processing by subspace unit. For instance, a dedicated processor for a simple geometric process and a dedicated processor for a complicated rendering process may be provided separately, or memory capacity provided on the processors may differ, so that the rendering units can have different processing performance and an appropriate processor or memory can be utilized according to the complexity level of the rendering processing by subspace unit.

The apparatus may further comprise a communication unit which receives image data rendered by subspace unit from an external distributed rendering processing device connected with the apparatus via a network, and the consolidation unit may consolidate the image data received from the external distributed rendering processing device with the image data generated by the rendering processing unit and generate the final output image data to be displayed. The distributed rendering processing devices may have the same structure as the apparatus according to this aspect of the present invention, and a system may be so configured that these apparatus can exchange the image data by subspace unit by communicating with each other and thus the final image data to be displayed can be generated on each apparatus.

The rendering processing may be assigned to a plurality of the distributed rendering devices, each of which has different network distance corresponding to level of detail in rendering by subspace unit. For instance, the distributed rendering device at a farther distance from the apparatus on the network may perform the rendering processing for a distant view to be rendered with a coarser level of detail and the communication unit of the apparatus may receive the rendering result from the distributed rendering device with a relatively long latency. On the other hand, the distributed rendering device at a closer distance from the apparatus on the network may perform the rendering processing for a close view to be rendered with a finer level of detail and the communication unit of the apparatus may receive the rendering result from the distributed rendering device with a relatively short latency.

According to another aspect of the present invention, an image processing apparatus is also provided. The apparatus comprises a graphic processing block and a central control block which controls the graphic processing block and these blocks are unified within a single device. The graphic processing block comprises a grouping unit which groups input three-dimensional objects into groups; a rendering processing unit which derives a subspace which contains the three-dimensional objects belonging to the same group to be an independent rendering unit and performs rendering processing individually on the subspace, and generates independent image data for each subspace; and a consolidation unit which generates final output image data to be displayed by consolidating the image data generated for each subspace. These function components perform graphic display processing according to instructions from the central control block. The central control block may be a CPU core which includes CPU, memory, and a control unit for controlling interrupt and DMA transfer.

According to still another aspect of the present invention, an image processing system including a plurality of image processing apparatus for exchanging information with each other via a network and performing distributed rendering processing is provided. The system comprises a grouping unit which groups input three-dimensional objects into groups; a rendering processing unit which derives a subspace which contains the three-dimensional objects belonging to the same group to be an independent rendering unit and performs rendering processing individually on the subspace, and generates independent image data for each subspace; and a consolidation unit which generates final output image to be displayed by consolidating the image data generated for each subspace, and the grouping unit, the rendering processing unit and the consolidation unit are functionally distributed among the plurality of the image processing apparatus. The system may be so configured that each of the image processing apparatus can include at least one of the function structures of the grouping unit, the rendering processing unit and the consolidation unit and a sequence of the rendering processing can be performed by the whole system.

According to still another aspect of the present invention, an image processing apparatus for exchanging information with other apparatus via a network may be provided. The apparatus comprises at least one of function blocks of: a grouping unit which groups input three-dimensional objects into groups; a rendering processing unit which derives a subspace which contains the three-dimensional objects belonging to the same group to be an independent rendering unit and performs rendering processing individually on the subspace, and generates independent image data for each subspace; and a consolidation unit which generates final output image to be displayed by consolidating the image data generated for each subspace, and a processing result by the function block which is not included in this apparatus is received from the other apparatus and utilized. For instance, the apparatus may receive the grouping result by the grouping unit in the other apparatus and utilize the result in its rendering processing unit. Conversely, the apparatus may send the processing result by its grouping unit and rendering processing unit to the other apparatus and the result may be utilized in the other apparatus.

According to still another aspect of the present invention, an image processing method is provided. The method comprises dividing a space into subspaces which overlap one another and performing rendering processing independently by subspace unit on a three-dimensional object in each of the subspaces, and consolidating rendering data of the three-dimensional object in each of the subspaces by evaluating a distance in depth direction.

According to still another aspect of the present invention, an image processing method is also provided. The method comprises grouping a plurality of three-dimensional objects into groups and performing rendering processing individually on a subspace which contains at least one of the three-dimensional objects belonging to the same group, and generating final image data to be displayed by consolidating rendering data of each subspace.

According to still another aspect of the present invention, a computer program executable by a computer is provided. The program comprising reading array data of a plurality of three-dimensional objects; grouping the three-dimensional objects which exist in a display area into groups; deriving a subspace which contains the three-dimensional objects belonging to the same group to be an independent rendering unit; performing rendering processing individually by subspace unit to generate image data for each subspace; and generating final image data to be displayed in the display area by consolidating the image data generated for each subspace.

Moreover, any arbitrary replacement or substitution of the above-described structural components and the steps, expressions replaced or substituted in part or whole between a method and an apparatus as well as addition thereof, and expressions changed to a system, a computer program, a storage medium, a transmission medium or the like are all effective as and are encompassed by the present invention.

This summary of the invention does not necessarily describe all necessary features, so that the invention may also be a sub-combination of these described features.

BRIEF DESCRIPTION OF THE DRAWINGS

FIG. 6 is a configuration block diagram of an image processing device according to an embodiment of the present invention.

FIG. 14 is an example of a processing procedures list to be used in division rendering processing.

FIG. 27 is an explanatory diagram of hierarchized Z-buffer used in Z-culling processing.

FIG. 30 is an explanatory diagram of Z-culling processing.

DETAILED DESCRIPTION OF THE INVENTION

The invention will now be described by reference to the preferred embodiments. This does not intend to limit the scope of the present invention, but to exemplify the invention.

At the beginning of describing the embodiment of the present invention, its basic concept will be described. A 3-D object is plotted by 3-D world coordinate. In order to render such an object on the screen, it is necessary to designate a view volume in the world coordinate system and according to this view volume, do clipping of the object to be projected on the display screen. As one of the projective methods of displaying a 3-D object on a two-dimensional display, there is a perspective projective method. With the perspective projective method, the apex of a view volume is generally the viewpoint and the view volume is a semi-infinite pyramid defined by the direction and angle from the viewpoint. In the present invention, the object space is divided into subspaces using quadrangular truncated pyramid view volumes which are attained by defining directions from the viewpoint, angles, and depths on the semi-infinite pyramid view volume.

Figure 1A:
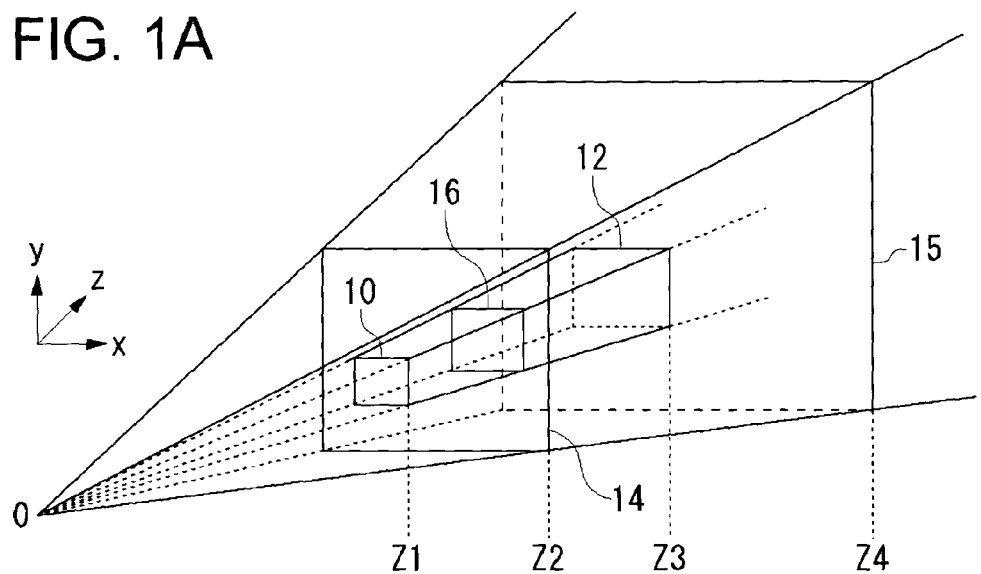
FIG. 1A is an explanatory diagram of quadrangular truncated pyramid view volumes in three-dimensional space and FIG. 1B is a top view.
Figure 1B:
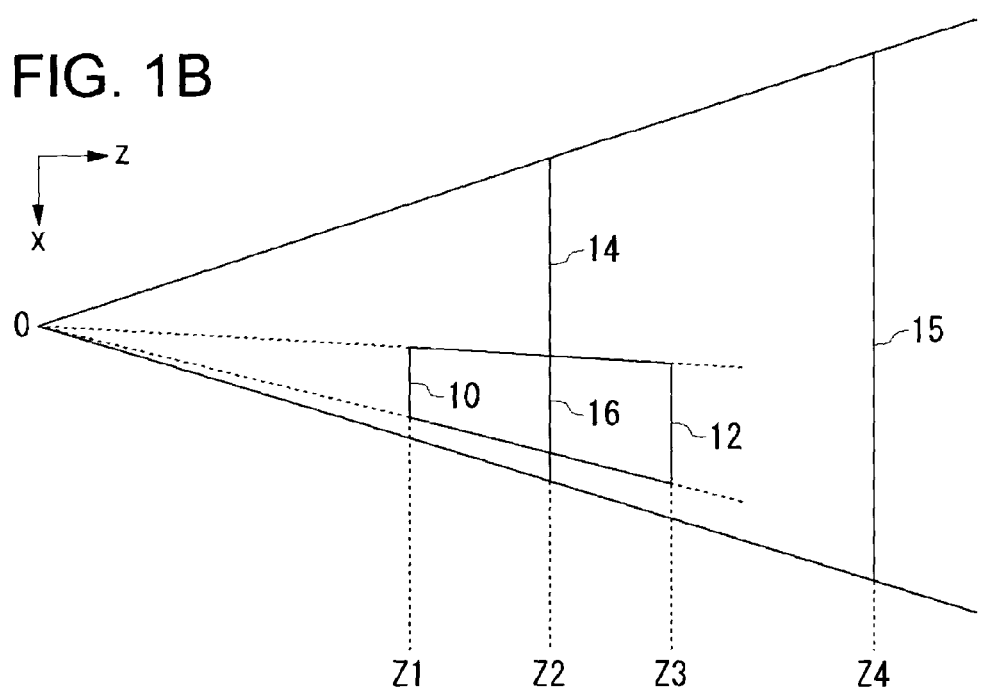

FIG. 1A is an explanatory diagram of quadrangular truncated pyramid view volumes in three-dimensional space and FIG. 1B is a top view. Within the visible region seen from the viewpoint O, a quadrangular truncated pyramid view volume (hereafter, "Brick") is set up. The depth of this brick is defined in the front by the front clipping plane 10 and in the back by the back clipping plane 12. The part 16 of the brick that the projection plane 14 intersects is the rendering area in the display screen and the object is projected and rendered within this area. Hereafter, the depth direction is indicated as z-axis and the plane parallel to the projection plane 14 is indicated as xy-plane. The front clipping plane 10, back clipping plane 12, projection plane 14, and back plane 15 are each located at respective points Z1, Z2, Z3, and Z4 from the viewpoint O. In the embodiment, such a brick is designated as an independent rendering unit. Then, rendering processing is done individually on such a brick. As a result, image data which is independent per brick is generated. Furthermore, image data generated by brick is consolidated to generate the final image data to be displayed.

Figure 2A:
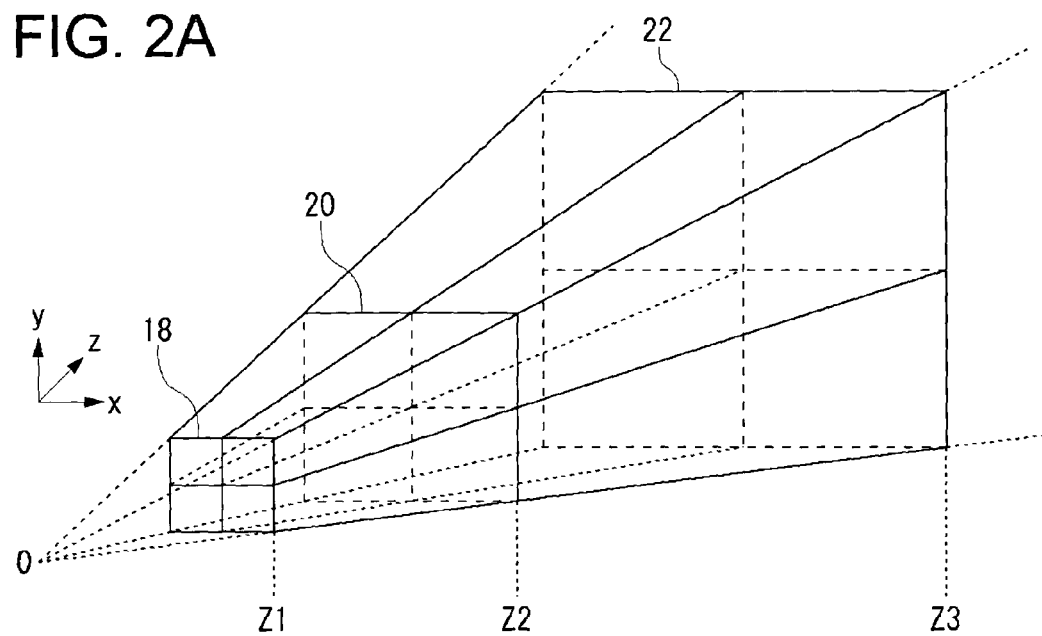
FIG. 2A is an explanatory diagram showing how a three-dimensional space is divided into bricks and FIG. 2B is a top view.
Figure 2B:
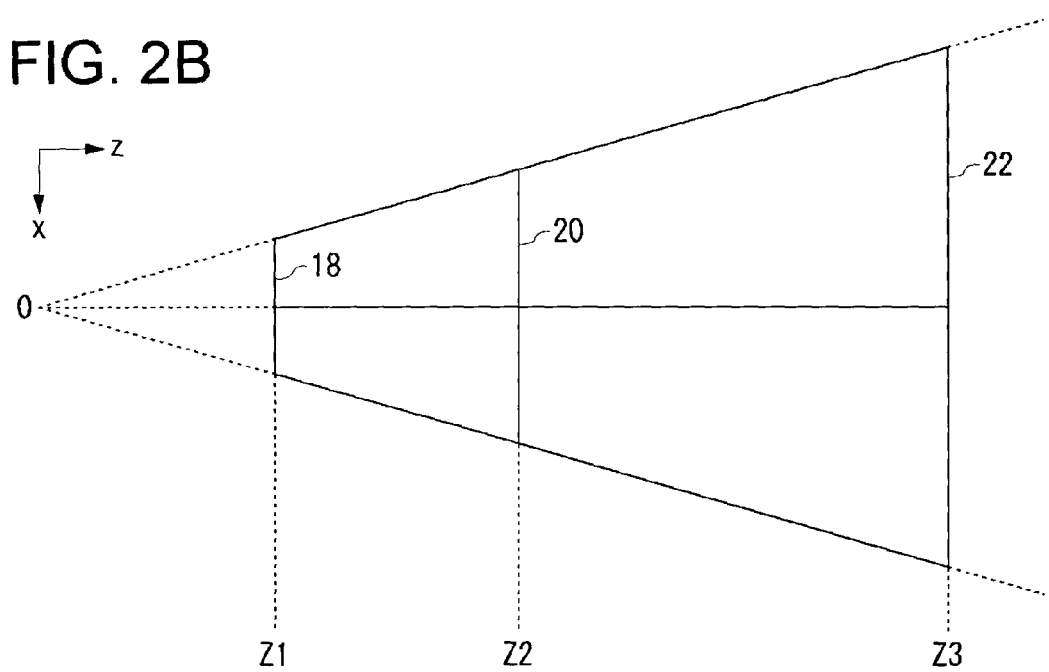

FIG. 2A is an explanatory diagram showing how a three-dimensional space is divided into bricks and FIG. 2B is a top view. The visible region of the quadrangular truncated pyramid shape, which is clipped by the first clipping plane 18 and the second clipping plane 20, is divided into 4 bricks which do not overlap one another. The visible region of the quadrangular truncated pyramid shape, which is clipped by the second clipping plane 20 and the third clipping plane 22, is also divided into 4 bricks which do not overlap one another. The first clipping plane 18, second clipping plane 20, and third clipping plane 22 are each located at respective points Z1, Z2, and Z3 from the viewpoint O. Thus, when the space is divided so that there are no overlapping bricks in the x,y directions, it is possible to do rendering processing similar to tiling and generate a large size final image using small high-speed VRAM area.

Figure 3A:
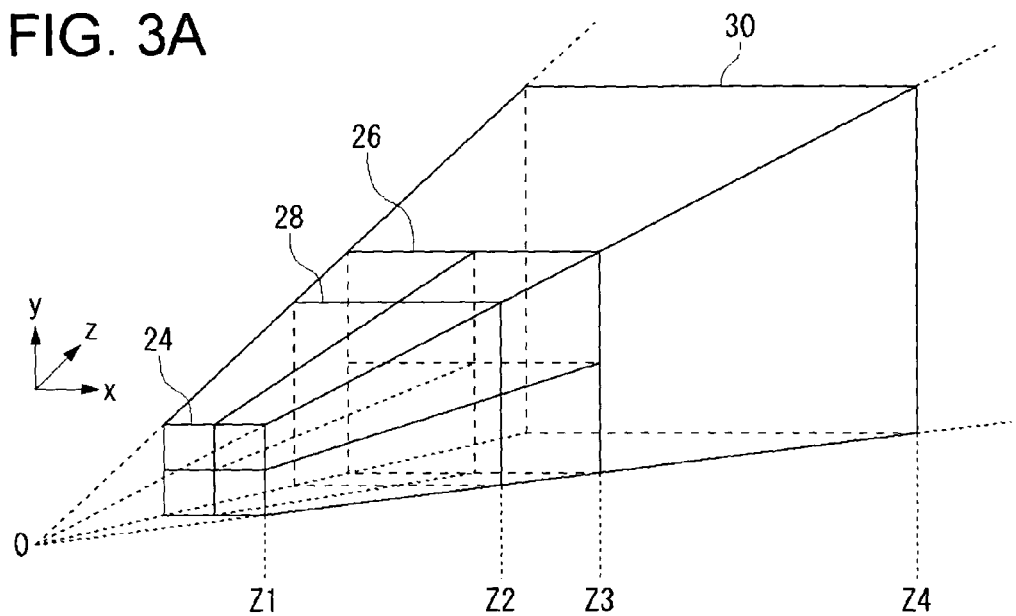
FIG. 3A is another explanatory diagram showing how a three-dimensional space is divided into bricks and FIG. 3B is a top view.
Figure 3B:
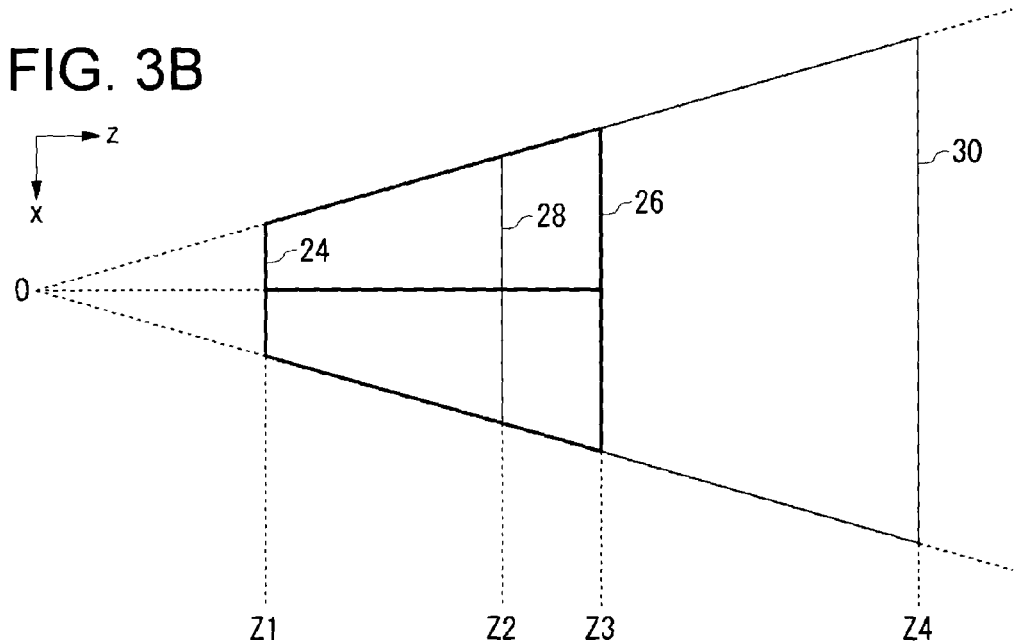

FIG. 3A is another explanatory diagram showing how a three-dimensional space is divided into bricks and FIG. 3B is a top view. There are 4 bricks which do not overlap one another. Their depth is defined in the front by the front clipping plane 24 located at point Z1 from the viewpoint O and in the back by the back clipping plane 26 located at Z3. They are overlapped in the z direction by the brick whose depth is defined in the front by the front clipping plane 28 located at point Z2 from the viewpoint O and in the back by the back clipping plane 30 located at Z4. The front brick is divided into 4 bricks but the back brick is not divided. This division is because a front object generally needs to be rendered in more detail than a back object, and in order to do this the front brick is divided into smaller regions to do higher resolution rendering processing. In other words, in order to do rendering processing by brick, using the same size memory, the back region, which generally requires a lower level of detail in rendering, is divided into larger parts, and the front region, which requires a higher level of detail in rendering, is divided into smaller parts.

Figure 4A:
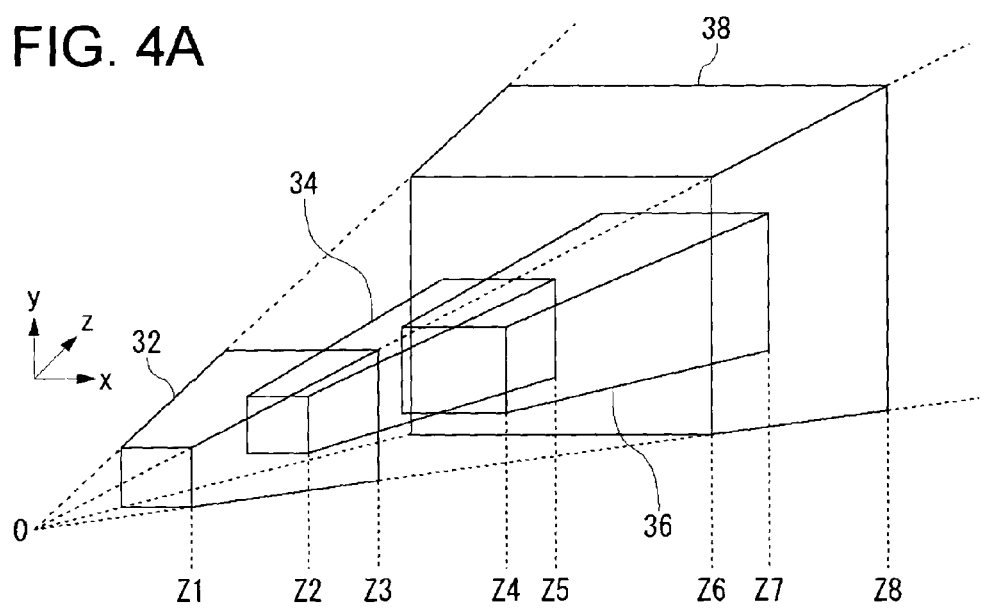
FIG. 4A is an explanatory diagram showing how a space is divided into further additional bricks and FIG. 4B is a top view.
Figure 4B:
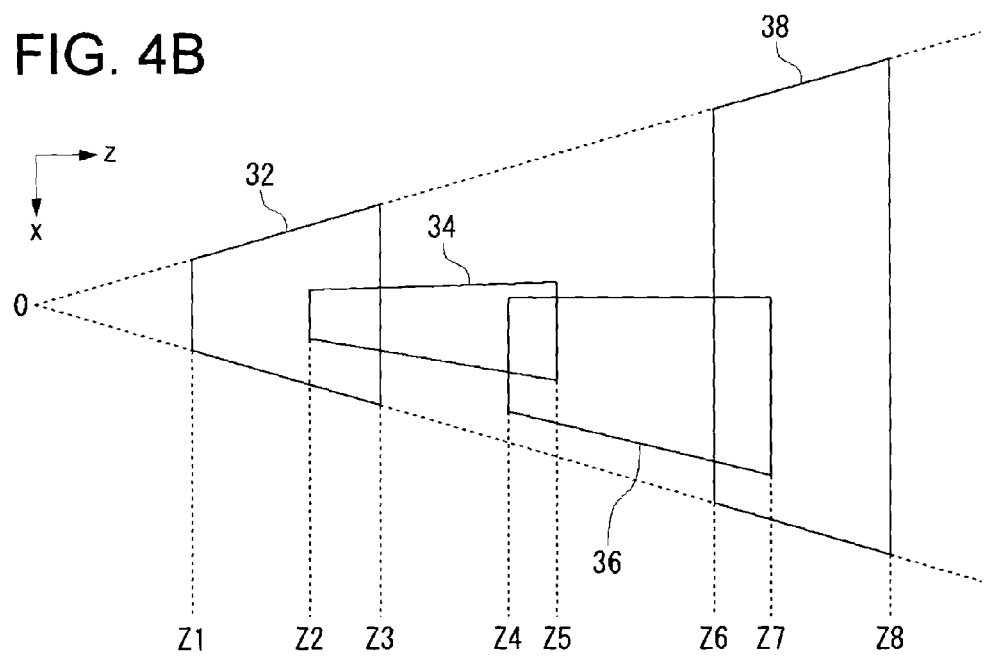

FIG. 4A is an explanatory diagram showing how a space is divided into further additional bricks and FIG. 4B is a top view. In this example, the first brick 32, second brick 34, third brick 36, and fourth brick 38 are set up within the visible region and they overlap one another not only in the z direction but also in the x,y directions. The front clipping plane and back clipping plane of the first brick 32 are located respectively at Z1 and Z3. The front clipping plane and back clipping plane of the second brick 34 are located respectively at Z2 and Z5. The front clipping plane and back clipping plane of the third brick 36 are located respectively at Z4 and Z7. The front clipping plane and back clipping plane of the fourth brick 38 are located respectively at Z6 and Z8. Thus, when division is done so that bricks overlap one another, it is possible to generate the final display image by consolidating image data using Z-merge rendering processing, which will be described later, after doing rendering processing by brick.

Figure 5A:
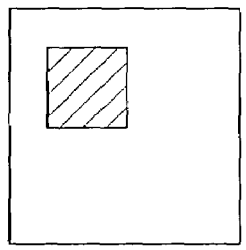
FIGS. 5A-5E are explanatory diagrams outlining Z-merge rendering processing which is done when the space is divided as shown in FIG. 4.
Figure 5B:
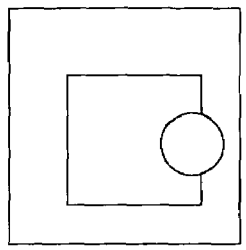
Figure 5C:
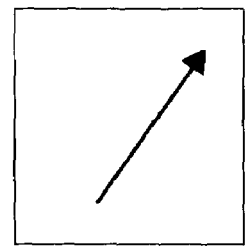
Figure 5D:
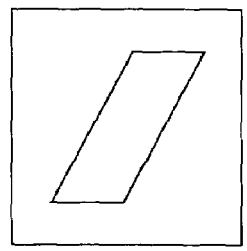
Figure 5E:
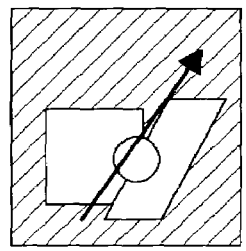

FIGS. 5A-5E are explanatory diagrams outlining the Z-merge rendering processing which is done when the space is divided as shown in FIG. 4. FIG. 5A is the result of rendering processing in the fourth brick 38, FIG. 5B is the result of rendering processing in the second brick 34, FIG. 5C is the result of rendering processing in the first brick 32, FIG. 5D is the result of rendering processing in the third brick 36. The rendering data in the respective divided spaces is either enlarged or contracted accordingly. Then, they are consolidated into one image by comparing depth values (hereafter referred to as Z-value). FIG. 5E is the image attained by consolidating the rendering data of the respective bricks as shown in FIGS. 5A-5D using Z-merge rendering processing.

FIG. 6 is a configuration block diagram of an image processing device 100 according to the embodiment of the present invention. The image processing device 100 includes an I/O port 108, main CPU 110, main memory 112, communication unit 114, and graphic processing block 120. Each of these blocks is connected to the bus 116.

The I/O port 108 controls data input/output for the input device 102 such as a mouse and keyboard, storage device 104 such as CD-ROM and hard disk drive, and display device 106 for displaying images.

The main CPU 110 has overall control of the image processing device 100, which for example, may be a 128-bit RISC (Reduced Instruction Set Computer)-CPU. The main CPU 110 implements the application program stored in the storage device 104. As a program is implemented, the main CPU 110 controls the graphic processing block 120 according to input by the user and displays images. The main CPU 110 controls parallel rendering by multi-path command especially for the graphic processing block 120.

The main memory 112 stores rendering data such as shape data and texture data of the object read out from the storage device 104, rendering processing program, and B-box array and group list, which will be described later.

The communication unit 114 communicates with some other image processing device 100 via the network. Such data communication enables rendering processing by distributed processing in cooperation with some other image processing device 100.

The graphic processing block 120 includes a parallel rendering engine 122, image memory 126, and memory interface 124. The memory interface 124 connects the parallel rendering engine 122 and image memory 126. They are configured into one body as ASIC (Application Specific Integrated Circuit)-DRAM (Dynamic Random Access Memory).

The parallel rendering engine 122 divides the entire storage region of the image memory 126 into multiple regions based on multi-path command from the main CPU 110. Using these multiple divided storage regions, it implements rendering of a three-dimensional object by subspace in parallel and generates divided images in the respective subspaces. Further, the parallel rendering engine 122 does Z-merge processing of each divided image rendered in parallel to consolidate image data in one of the divided regions. Thus, it generates one consolidated image. Z-buffer method, scan line method, ray tracing method, and such are used during rendering to remove hidden lines and hidden surfaces.

The image memory 126 is DRAM which is divided into multiple regions. It is divided into the following regions: a frame buffer region in which the RGB value of each pixel and A value indicating the transparency α are stored, Z-buffer region in which the Z-value indicating the depth value of each pixel is stored, and texture region in which the texture features used for texture mapping are stored. Each of these regions is independently controlled. Also, it is possible to implement rendering processing in parallel by multiple brick units through doing rendering independently with multiple channels. For example, a parallel rendering engine consisting of 8 4 MB area DRAMs may be operated with 4 channels. Further, the rendering area and texture area can be switched accordingly and a rendered image data can also be used as texture data.

For example, when using 4 out of 8 divided storage regions as rendering regions and using the other 4 as texture regions, the parallel rendering engine 122 processes the texture data stored respectively in the 4 texture regions and renders divided images with Z-value respectively in the 4 rendering regions. Next, the parallel rendering engine 122, based on multi-path command from the main CPU 110, consolidates these divided images into one image in one of the divided storage regions by Z-merge rendering processing.

Figure 7:
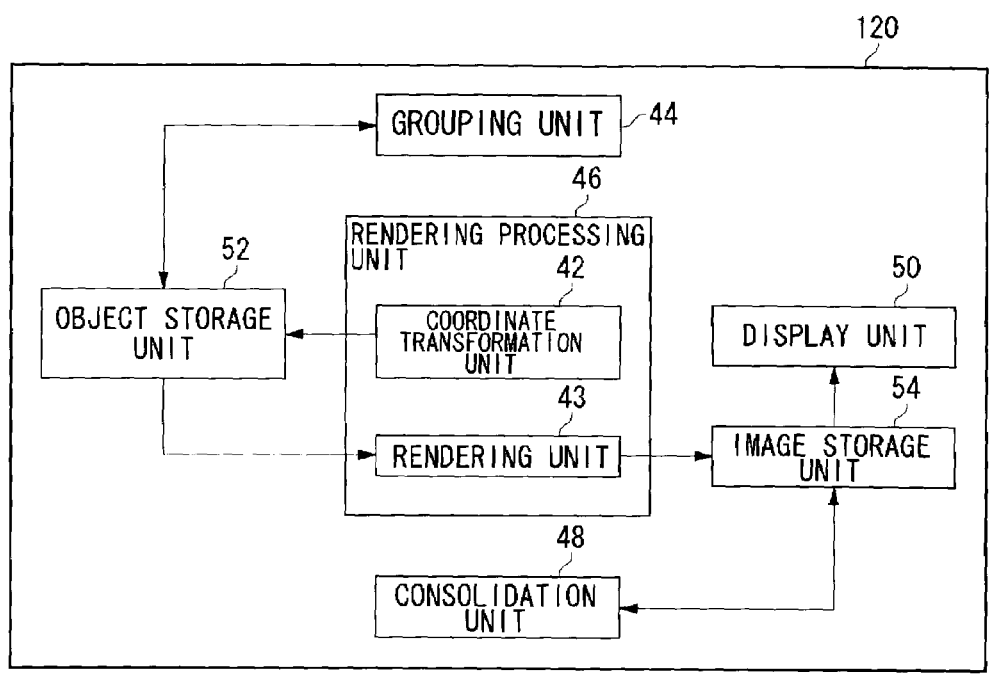
FIG. 7 is a block diagram showing the functions of the graphic processing block in the image processing device of FIG. 6.

FIG. 7 is a block diagram showing the functions of the graphic processing block 120 in the image processing device 100. The functions shown in the figure are realized primarily in the parallel rendering engine 122 of the graphic processing block 120, main interface 124, and image memory 126, and according to the circumstances the main CPU 110 and main memory 112 are used. The figure is a block diagram focusing attention on functions and the functions identified in the function blocks can be realized in various ways such as using only hardware or only software, or a combination of both.

The object storage unit 52 stores three-dimensional object data. An individual object or a group of objects is represented by a simple structure such as a sphere, cuboid, or polyhedron, which encloses the spatial region which an object or a group of objects occupies. Such a structure is called a B-box (Boundary-box). The object storage unit 52 stores the array data of such B-boxes in addition to three-dimensional object data. The grouping unit 44 reads in B-box array from the object storage unit 52, does grouping of multiple B-boxes into groups based on the object characteristics and LOD information, and creates a group list to be stored in the object storage unit 52.

The rendering processing unit 46 includes a coordinate transformation unit 42 and rendering unit 43. The coordinate transformation unit 42 derives a subspace which is a quadrangular truncated pyramid through perspective projection and does perspective transformation of a three-dimensional object. The rendering unit 43 does individual rendering processing in the quadrangular truncated pyramid. The coordinate transformation unit 42 reads in the group list from the object storage unit 52, derives the brick in which there are B-boxes belonging to the same group, and does clipping processing for the object and geometry processing such as coordinate transformation by perspective transformation. The rendering unit 43 generates image data by doing rendering processing independently by brick to be stored in the image storage unit 54. Color information data of pixels and depth value data of pixels is generated as image data. The former is stored in the form of RGB buffer and the latter is stored in the form of Z-buffer.

The consolidation unit 48 reads in image data generated per brick, from the image storage unit 54. After correcting the dynamic range of the depth value of each pixel of image data, it consolidates image data by comparing corrected depth values and generates the final image to be displayed. Generated image data is stored in the image storage unit 54. The display unit 50 reads out consolidated image data from the image storage unit 54 and displays it on the display.

Figure 8:
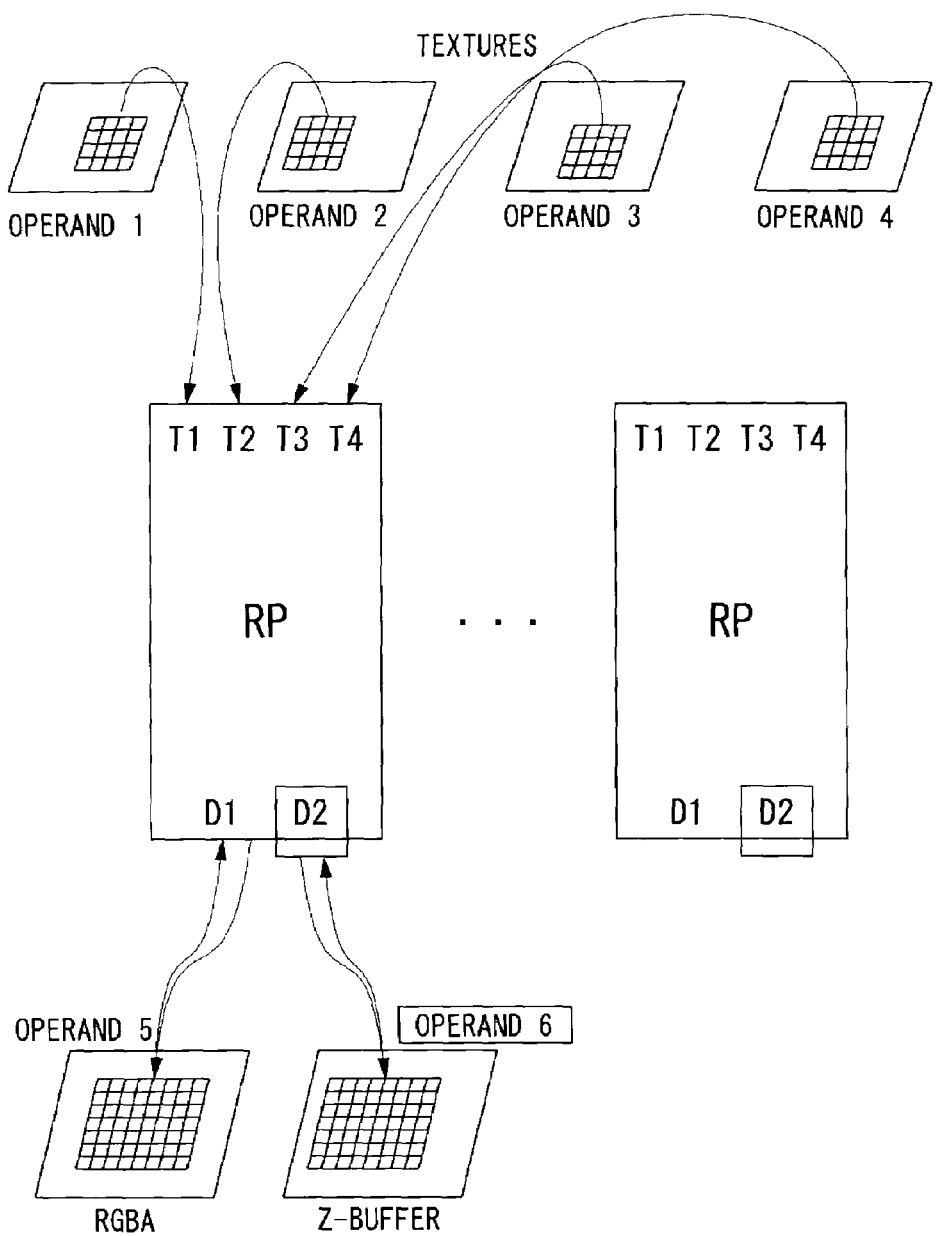
FIG. 8 is an explanatory diagram showing a configuration example of parallel processing in the rendering processing unit of FIG. 7.

FIG. 8 is an explanatory diagram showing a configuration example of parallel processing in the rendering processing unit 46. The rendering processing unit 46 is configured by multiple rendering pipes RP each of which is configured by many operands. In each rendering pipe RP, the data of 4 textures stored in buffer, T1 through T4, which were respectively designated in the operand 1 through operand 4 is input. Also, each rendering pipe RP does reading and writing of the data D1 for RGBA buffer designated in the operand 5 and the data D2 for Z-buffer designated in the operand 6. Each rendering pipe RP outputs Z-value whose dynamic range was corrected with the formula D2=f2 (T1, T2, T3, and T4) which will be described later. Further, each rendering pipe RP does Z-merge rendering processing with the formula D1=f1 (T1, T2, T3, T4, D1, and D2) and outputs consolidated image data.

Referring to FIGS. 9 through 14, the division rendering processing procedure and consolidation processing procedure by the graphic processing block 120 in the block diagram of FIG. 7 will be described.

Figure 9:
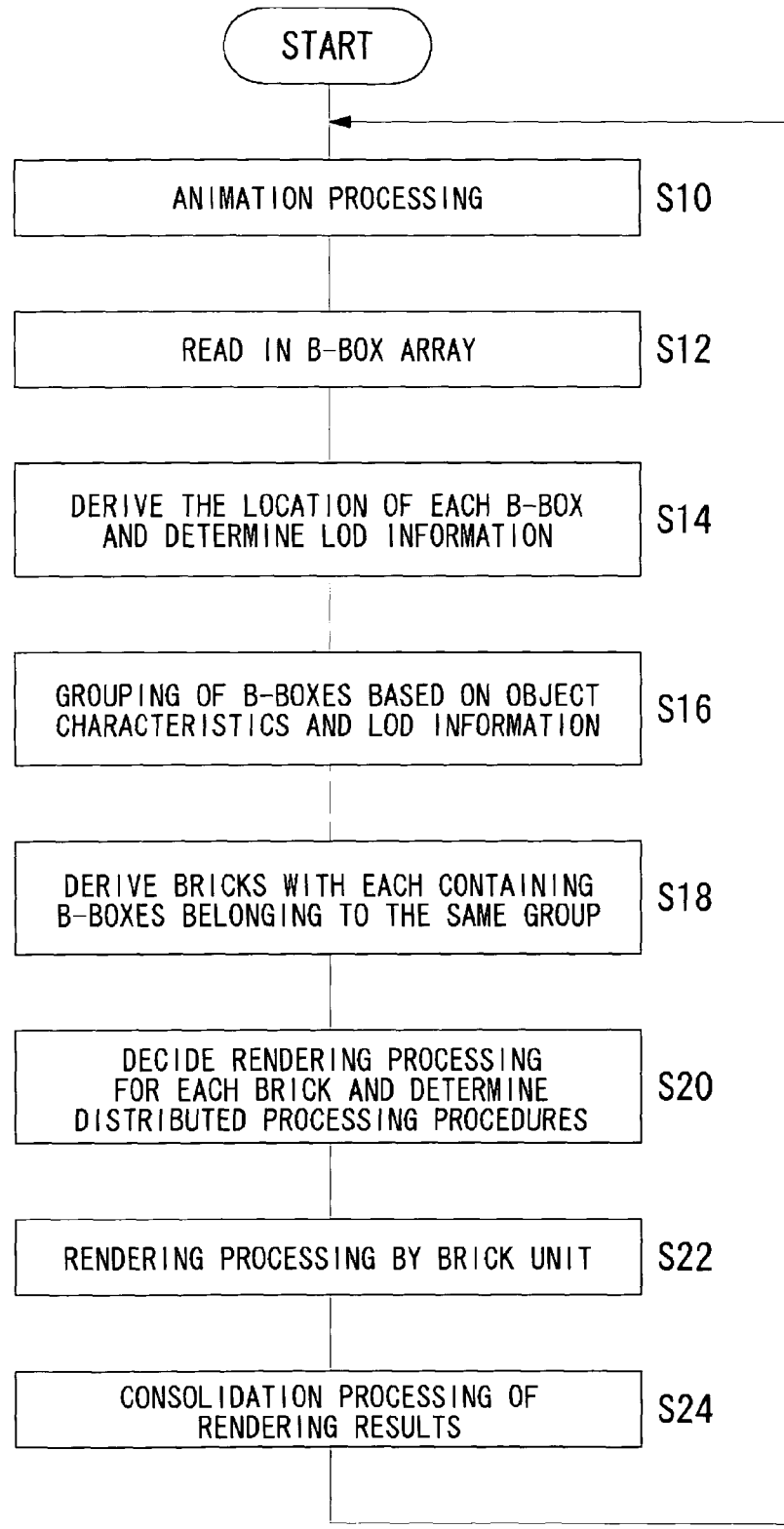
FIG. 9 is a flow chart describing division the rendering processing procedure and consolidation processing procedure by the graphic processing block of FIG. 7.

FIG. 9 is a flow chart describing the division rendering processing procedure and consolidation processing procedure. Animation processing of a three-dimensional object is done (S10). In animation processing, positional renewal of the viewpoint and object and shape change of the object are made according to the motion program.

The grouping unit 44 reads in the array of B-boxes for the objects processed by animation processing from the object storage unit 52 (S12), derives the position of each B-box in the viewpoint coordinate system, and determines clipping information and LOD (Level of Detail) information based on the distance from the viewpoint (S14). LOD information is a level indicating how precisely the object shall be rendered. The level of rendering is generally determined based on the distance from the viewpoint. For example, for an object whose position is far from the viewpoint a lower LOD is prescribed and for an object whose position is close to the viewpoint a higher LOD is prescribed.

Further, the grouping unit 44 checks the object characteristics and LOD information of B-boxes determined to be within the rendering area based on the clipping information, and based on object characteristics and LOD information groups identical or similar B-boxes together, and creates a group list (S16).

In this case, object characteristics include information indicating the type of object such as background, person, or building, in addition to information indicating motion characteristics of the object such as whether it is static or dynamic. The designer can set up in advance group identification information to facilitate the grouping of objects. Such group identification information can be used as the object characteristics. For example, for objects to be grouped in the same group, the designer can set up the same group identification information. For objects to be grouped in a different group, the designer can set up different group identification information.

Figures 10A, 10B:
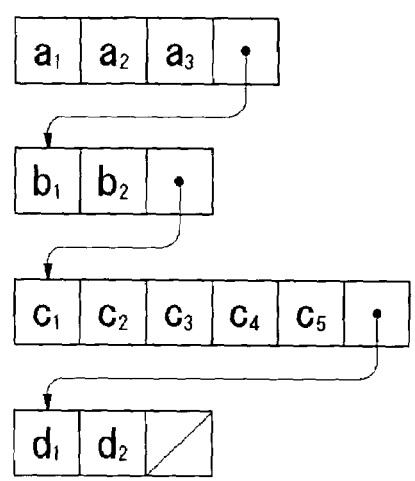
FIG. 10A is an example of grouping in a B-box array and FIG. 10B is a group list generated based on the grouping in FIG. 10A.

FIG. 10A is an example of grouping in a B-box array. Among the elements in the B-box array, those in the rendering area are grouped. For example, B-box array elements a1, a2, and a3 are grouped in the group A and the elements b1 and b2 are grouped in the group B. FIG. 10B is a group list generated based on the grouping in FIG. 10A. In the list, the elements a1 through a3 in the group A, elements b1 and b2 in the group B, elements c1 through c5 in the group C, and elements d1 and d2 in the group D are listed in sequence.

Going back to FIG. 9, the rendering processing unit 46 derives bricks in which there are B-boxes belonging to the same group based on the group list and correlates them with the corresponding group in the group list (S18).

Figure 11A:
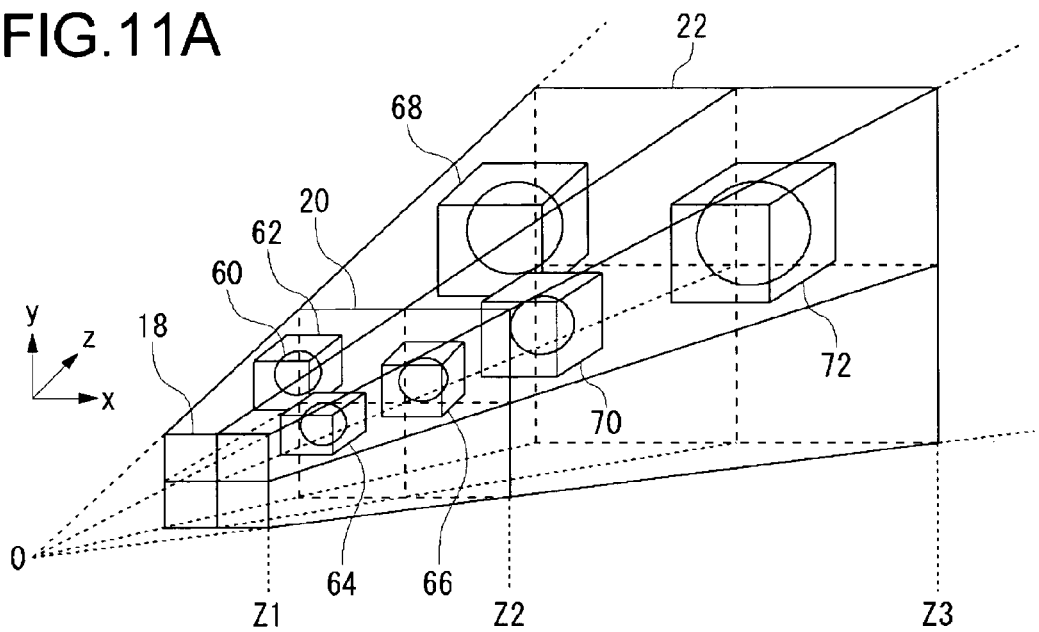
FIG. 11A is an explanatory diagram based on the example of space division in FIG. 2 showing bricks in which there are B-boxes belonging to the same group.
Figure 11B:
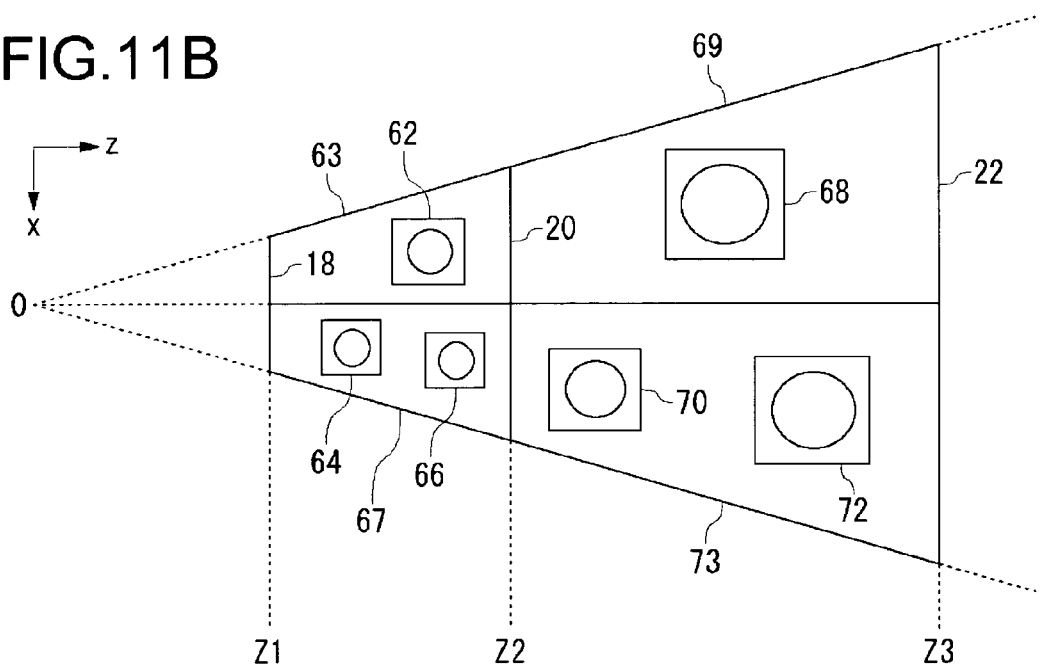
FIG. 11B is a top view.

FIG. 11A is an explanatory diagram based on the example of space division in FIG. 2 showing bricks in which there are B-boxes belonging to the same group. FIG. 11B is a top view. The B-box 62, which contains the three-dimensional object 60 in the region clipped by the first clipping plane 18 and second clipping plane 20, is one group. The brick 63, which is clipped by the front clipping plane 18 and back clipping plane 20, is derived to be the subspace containing the B-box 62. Likewise, the two B-boxes 64 and 66 belong to another group and the brick 67, which is clipped by the front clipping plane 18 and back clipping plane 20, is derived to be the subspace containing them.

In the region between the second clipping plane 20 and third clipping plane 22, the brick 69 is derived to be the subspace which contains the one B-box 68, and the brick 73 is derived to be the subspace which contains the two B-boxes 70 and 72. In order to simplify the explanation, B-boxes contained in other bricks are not shown.

Thus, the three B-boxes 62, 64, and 66, which are located between points Z1 and Z2 from the viewpoint, and the three B-boxes 68, 70, and 72, which are located between points Z2 and Z3 are assigned to separate subspaces which do not overlap one another in the z direction, primarily due to the difference in LOD information. Further, in order to enable division rendering processing in a yet smaller region, each of these subspaces is divided into 4 subspaces, which do not overlap one another in the x,y directions, either. Thus, when the space occupied by three-dimensional objects can be divided into subspaces without overlapping in the x, y, and z directions, as long as there is no object on the Z boundary, it is possible to do rendering processing of each brick independently without Z-merge rendering processing and scissoring processing in the z direction. However, if an object is too large, it may be necessary to break down the object to be assigned to multiple bricks. In such cases, scissoring processing in the Z direction is required.

Figure 12A:
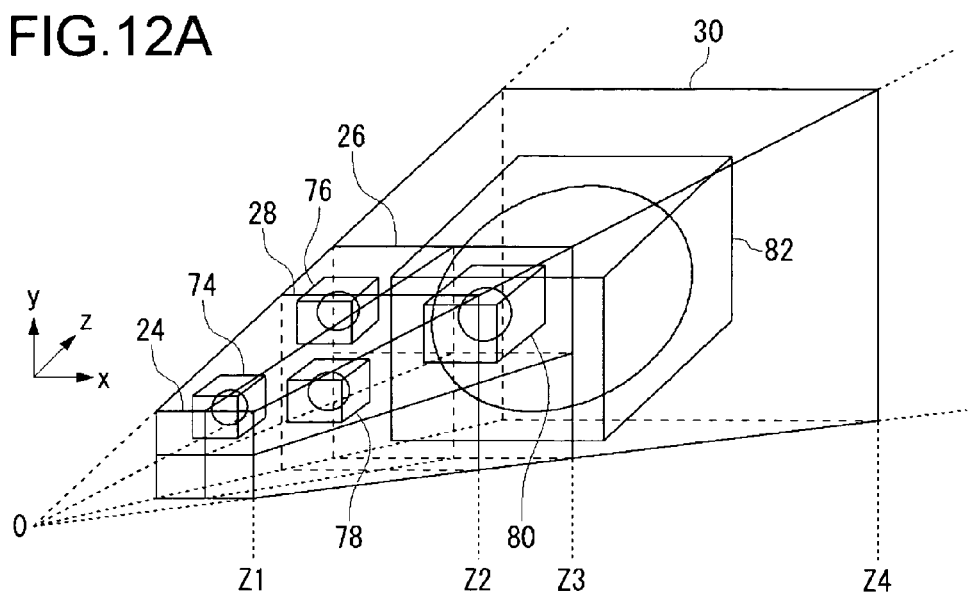
FIG. 12A is an explanatory diagram of bricks in which there are B-boxes belonging to the same group, using the example of space division in FIG. 3.
Figure 12B:
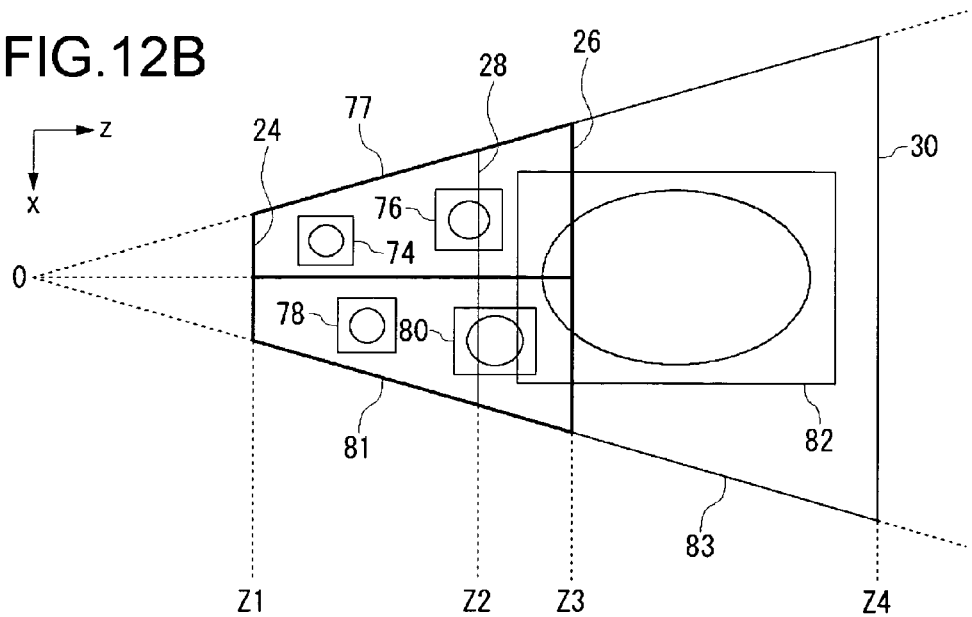
FIG. 12B is a top view.

FIG. 12A is an explanatory diagram of bricks in which there are B-boxes belonging to the same group, using the example of space division in FIG. 3. FIG. 12B is a top view. The two B-boxes 74 and 76, in the region clipped by the front clipping plane 24 located at point Z1 from the viewpoint O and back clipping plane 26 located at Z3, belong to one group. The brick 77, which is clipped by the front clipping plane 24 and back clipping plane 26, is derived to be the subspace containing them. Likewise, the other two B-boxes 78 and 80 belong to another group and the brick 81, which is clipped by the front clipping plane 24 and back clipping plane 26, is derived to be the subspace containing them.

At the same time, in the region clipped by the front clipping plane 28 located at point Z2 from the viewpoint O and back clipping plane 30 located at Z4, there is the one B-box 82, and the brick 83, which is clipped by the front clipping plane 28 and back clipping plane 30, is derived to be the subspace containing it.

In this example, the two B-boxes 80 and 82 overlap each other in the z direction and they belong to different groups. As a result, the two bricks 77 and 81 in the front are overlapped by the brick 83 in the back in the z direction. Thus, even if there is an object on the Z boundary as a result of allowing the division of space into subspaces which overlap one another in the z direction, it is possible to express the object by rendering processing by brick unit without breaking down the object in the z direction. Further, if the object is a convex object, Z-merge rendering processing can be skipped. Also, in this example, since there is no overlapping in the x,y directions, it is possible to do rendering processing after breaking down the object by brick using scissoring processing.

Figure 13A:
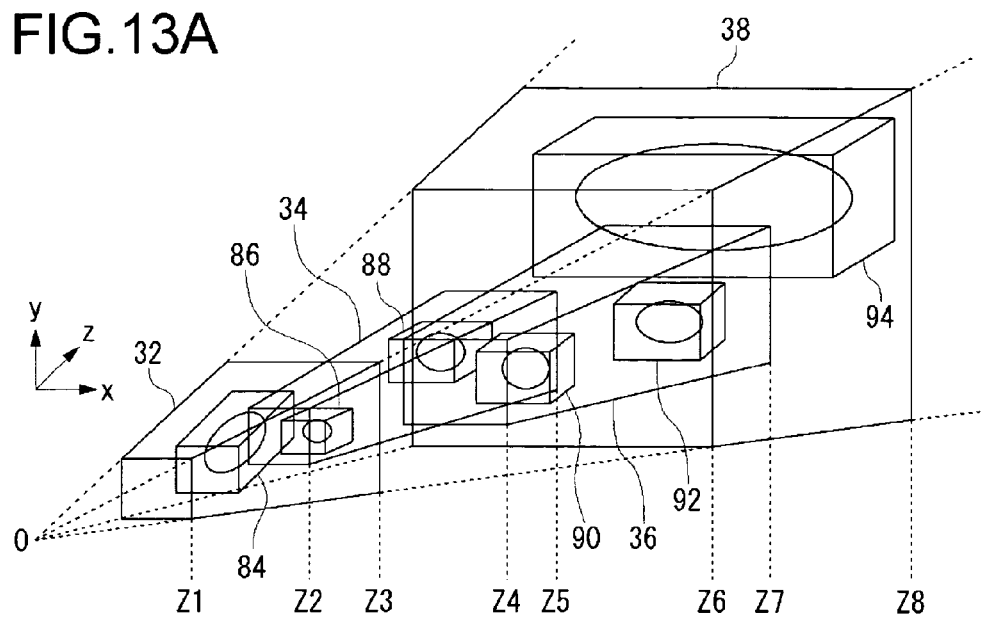
FIG. 13A is an explanatory diagram of bricks in which there are B-boxes belonging to the same group, using the example of space division in FIG. 4.
Figure 13B:
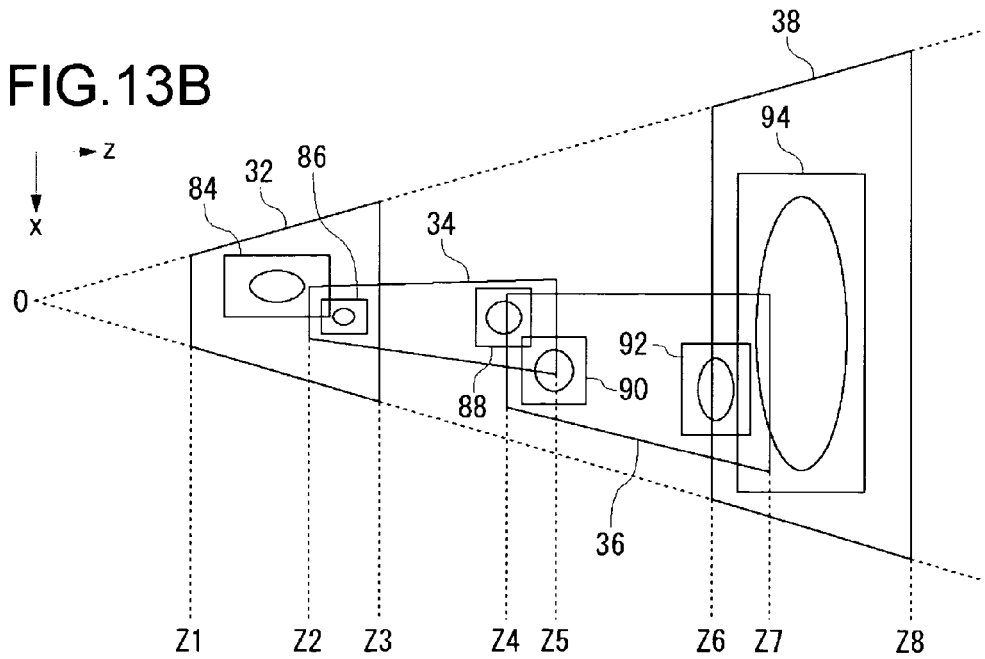
FIG. 13B is a top view.

FIG. 13A is an explanatory diagram of bricks in which there are B-boxes belonging to the same group, using the example of space division in FIG. 4. FIG. 13B is a top view. The brick 32 is derived to be the subspace which contains the one B-box 84 as a group which is located closest to the viewpoint O. Likewise, the brick 34 is derived to be the subspace, which contains the two B-boxes 86 and 88 as a group, and the brick 36 is derived to be the subspace, which contains the two B-boxes 90 and 92 as a group. Finally, the brick 38 is derived to be the subspace, which contains the one B-box 94 as a group which is located farthest from the viewpoint O.

The four bricks 32, 34, 36, and 38, which were thus derived, overlap one another, not only in the z direction, but also in the x,y directions. Since this is a space division which allows subspaces to overlap one another in the x,y directions, it is possible to divide a space by object unit even in the x,y directions. As a result it is possible to reduce the load due to scissoring processing.

Going back to FIG. 9, the rendering processing unit 46 selects the rendering area of each brick and selects the rendering processing to be done based on the characteristics of the object in each brick and LOD information, determines the distribution to parallel processing and scheduling of parallel processing based on the dependency relation between bricks, and creates a processing procedures list (S20).

FIG. 14 is an example of a processing procedures list, in which the groups A through G, which are to be allocated to the rendering pipes RP1 through RP4, are listed. The rendering processing unit 46 is capable of doing rendering processing individually by brick. When there is a difference between LOD determined by brick unit, the complexity of rendering processing varies by bricks. Also, a different rendering algorithm may be used depending on the characteristics and type of the objects in a brick. Then, it is possible to determine how to distribute the processing based on the complexity of processing of each brick, for example, distributing the processing to the bricks requiring complicated and time-consuming rendering processing and the others requiring simple rendering processing. When there is a transparent object, the order relation must be considered when overlapping objects. In such cases, the scheduling is determined so that rendering processing proceeds individually according to the order of overlapping.

The rendering processing unit 46 does rendering processing by brick unit based on the processing procedures list (S22). The rendering processing unit 46 can select rendering stratagem individually by brick unit. For example, it can do multi-resolution rendering by selecting a resolution which varies by brick. When doing defocus processing, high-speed defocus processing is possible with the appropriate memory capacity by dividing the space for focus processing and selecting a resolution for each brick corresponding to the level of defocusing.

Also, in the rendering processing unit 46, it is possible to apply a rendering algorithm individually by brick unit. For example, the method for removing hidden lines and hidden surfaces used for rendering, such as the Z-buffer method, scan line method, or ray tracing method may be selected accordingly and applied. Further, the method for shading such as the flat shading method, Gouraud shading method, smooth shading method, or such may be selectively applied.

Again, in reference to FIG. 9, the consolidation unit 48 generates the final output image by consolidating the rendering results of each brick by Z-merge rendering processing (S24). Then, going back to step S10, it does the next animation processing and repeats the rendering processing from division rendering processing to consolidation processing.

When consolidating image data generated by division rendering into the final output image, as was described in FIG. 5, affine transformation processing such as enlarging and contracting is done for the image data of each brick. In this regard, in order to match the resolution of image data generated by division rendering with the resolution of consolidated image data, it is necessary to interpolate the pixel value of image data for each brick accordingly. To do this, interpolation methods such as bilinear interpolation, which approximates the pixel values using internal division, and bicubic interpolation, which approximates the variation of pixels using cubic spline function are used.

Figure 15A:
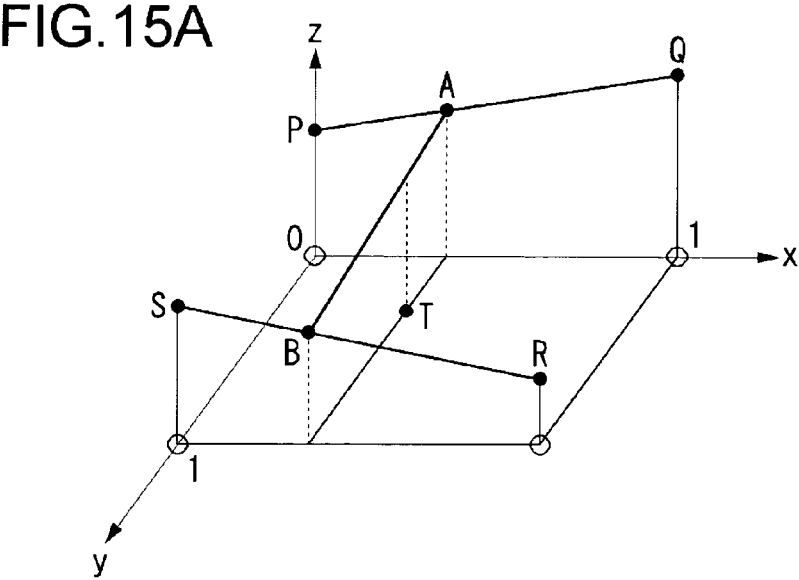
FIG. 15A is an explanatory diagram showing image data generation processing by bilinear interpolation and FIG. 15B is an explanatory diagram showing image data generation processing by bicubic interpolation.

FIG. 15A is an explanatory diagram showing image data generation processing by bilinear interpolation. For example, consider a situation in which it is necessary to generate pixel data at point T as the final output image display. There is no pixel data corresponding to that position in the rendering data by brick unit, however, there are four pixel data P, Q, R, and S in proximity. In such a case, the pixel data for the final image at point T is generated by interpolating the pixel values of the four pixel data P, Q, R, and S in proximity. These pixel data are indicated as points in three-dimensional space with the pixel value being the height in the z direction and their coordinate positions are plotted on grid points on the xy plane. On the plane y=0, the two points P and Q are divided internally to attain point A, and on the plane y=1 the two points S and R are divided internally to attain point B. Next, on the line on the plane, which goes through point T and is vertical to the x-axis, the points resulting from internal division, points A and B, are themselves divided internally to attain the height of point T, in other words, the pixel value.

Figure 15B:
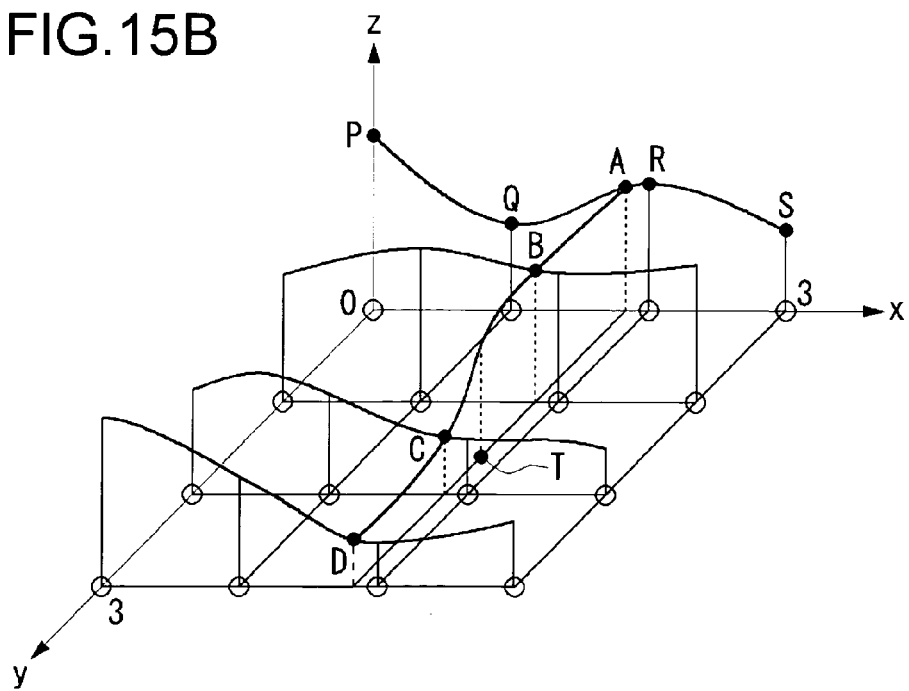

FIG. 15B is an explanatory diagram showing image data generation processing by bicubic interpolation. When generating pixel data where the position of the final output image to be displayed is point T, the pixel value is derived by interpolation using 16 pixel data from the surrounding area. On the plane y=0, the curved line which goes through four points P, Q, R, and S is calculated by the cubic spline function. Likewise, on the planes y=1, y=2, and y=3, the curved lines which go through the four points in the x-axis direction are respectively calculated. Next, the points at which these four curved lines intersect the plane which goes through point T and is vertical to the x-axis are plotted. Then, the curved line, which goes through these four intersecting points, is calculated. The z coordinate where this curved line meets the plane which goes through point T and is vertical to the y-axis, in other words the height of point T, is the pixel value.

Figure 16A:
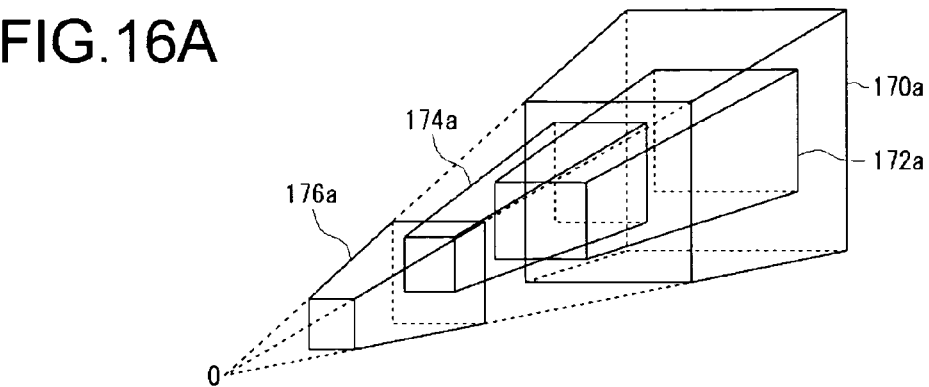
FIGS. 16A-16C are explanatory diagrams of Z-merge rendering processing.
Figure 16B:
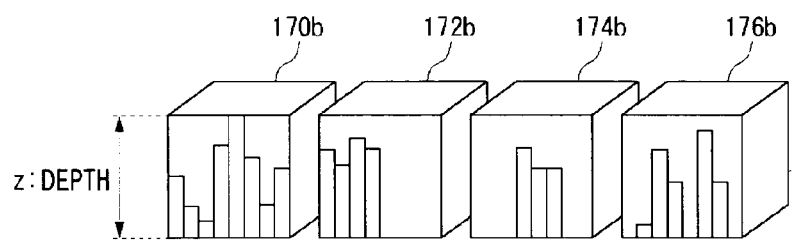
Figure 16C:
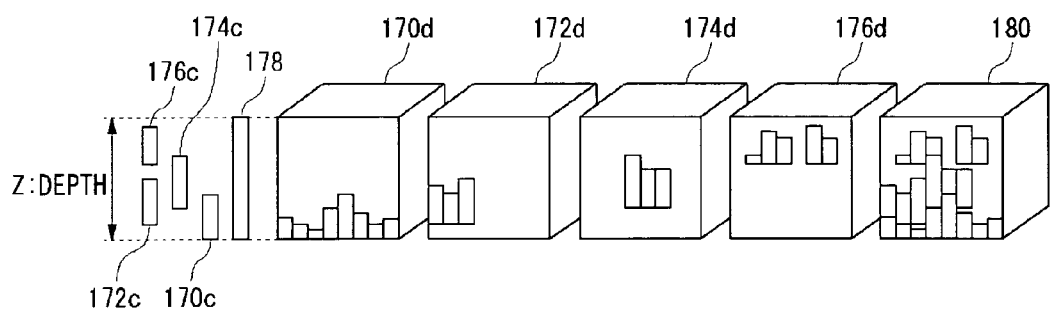

FIGS. 16A-16C are explanatory diagrams of Z-merge rendering processing. As shown in FIG. 16A, consider a situation in which an object space is divided into the four bricks 170a, 172a, 174a, and 176a, which overlap one another. FIG. 16B shows the Z-value distributions 170b, 172b, 174b and 176b of rendering data corresponding respectively to the four bricks 170a, 172a, 174a, and 176a in FIG. 16A. Z-value is a depth specified locally within each brick and is not for indicating the absolute depth in the original space before division. In order to consolidate rendering data of each brick, it is necessary to correct the dynamic range of the Z-values into the absolute values of the original space.

FIG. 16C shows the Z-values after the dynamic ranges of each brick have been corrected, and also the distributions of the absolute Z-values in the original space, which are attained by consolidating the Z-values above. For the Z-value range 178 of rendering data after consolidation, the corrected Z-value ranges 170C, 172C, 174C and 176C correspond respectively to the four bricks 170a, 172a, 174a, and 176a. The dynamic ranges of the Z-values specified locally within each brick are corrected to conform to these corrected Z-value ranges. The corrected Z-value distributions 170d, 172d, 174d, and 176d correspond respectively to the Z-value distributions of the four rendering data 170b, 172b, 174b, and 176b in FIG. 16B. These corrected Z-value distributions 170d, 172d, 174d, and 176d are consolidated to be the Z-value distributions for the final rendering data 180.

Thus, after the dynamic ranges of the Z-values are corrected, hidden surfaces are removed by the Z-buffer method and the final consolidated image is rendered. When doing rendering by pixel unit using the Z-buffer method, it is possible to generate a semitransparent composite image by doing alpha blending using the A value of each pixel.

The depth z specified locally within a brick is transformed to the depth Z of the original space before division using the linear transformation formula $Z=(a/A)*z+b$. The constant A is the maximum depth value specified locally within a brick and the constant a is the maximum depth value of the corresponding brick in the original space before division. The constant b is the distance from the viewpoint to the clipping plane of the corresponding brick.

As was described above, in the image processing device according to the embodiment, it is possible to do grouping of three-dimensional objects based on their characteristics and LOD, divide the space into bricks each of which contains objects belonging to the same group, and do rendering processing individually by brick. As well as it realizes higher speed rendering processing by dividing the space and doing the processing in parallel, it is also capable of applying rendering processing in conformity to object characteristics. Also, by limiting the size of a brick to a prescribed size, it is possible to keep the size of VRAM required for rendering processing by brick unit down to a fixed size. Further, by grouping three-dimensional objects, it is possible to do data management related to textures and object models collectively by group unit, which realizes compatibility of rendering algorithm easily and facilitates version control.

Although the present invention has been described by way of exemplary embodiments, it should be understood that many changes and substitutions may be made by those skilled in the art without departing from the scope of the present invention which is defined by the appended claims. Some such alterations are stated as follows.

In the embodiment, space was divided into quadrangular truncated pyramids defined by perspective projection. However, the space may also be divided into parallelepipeds defined by parallel projection. Thus, division rendering processing in the present invention is not limited to a certain projective method.

In rendering processing of an object by divided space unit, the data locality is guaranteed. Mutual dependence relation of divided spaces can be handled by consolidating rendering data of each divided space using Z-merge rendering processing. Therefore, the final output image can be generated in the following way: distribute rendering processing by divided space unit to the compute nodes which are connected through the network and then consolidate the rendering data computed in each node in the central compute node. Such a computing network may be one in which the compute nodes are connected peer to peer by a broadband network. Also, it may be configured so that each compute node contributes to the entire network system as a cell and the operation systems of these cells work together so that it operates as one huge computer. The division rendering processing in the present invention is suitable for distributed processing using such a computer network and therefore, is capable of rendering processing which requires a large-scale computing resource.

Further, in the distributed rendering processing system for such a computer network, it is possible to define the network distance parameters based on the number of routing hops and communication latency between the central compute node and distributed compute node. Therefore, it is also possible to coordinate the distance from the viewpoint to the object to be rendered by divided space unit and the distance from the central compute node to distributed compute node and distribute rendering processing by divided space unit to the compute node. In other words, since the image data of an object located close to the viewpoint is frequently renewed according to the movement of the viewpoint or the object itself, rendering processing is done in a compute node at a close location on the network and rendering results are consolidated in the central node with a short latency. On the other hand, since the image data of an object located far from the viewpoint does not change much with the movement of the viewpoint or the object itself, rendering processing can be done in a compute node at a far location on the network and there is no problem even if the latency before the rendering results reach the central node is long.

In the embodiment, Z-merge rendering processing is done when the bricks derived based on grouping of objects overlap one another in the z direction. However, grouping of objects may be determined so that Z-merge rendering processing is not necessary, in other words, the bricks do not overlap one another in the z direction. Referencing FIG. 17 through FIG. 20, such a modified example will be described below.

Figure 17A:
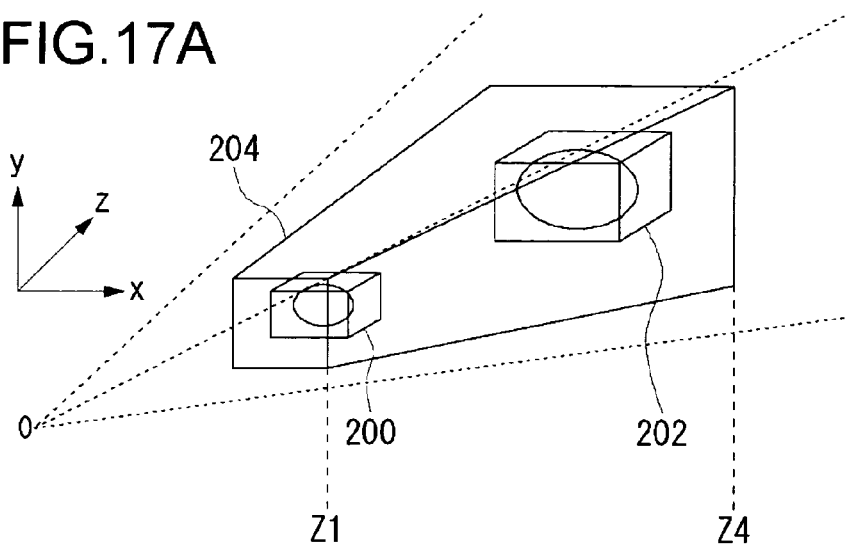
FIG. 17A is an explanatory diagram of bricks in which there are B-boxes belonging to the same group and FIG. 17B is a top view.
Figure 17B:
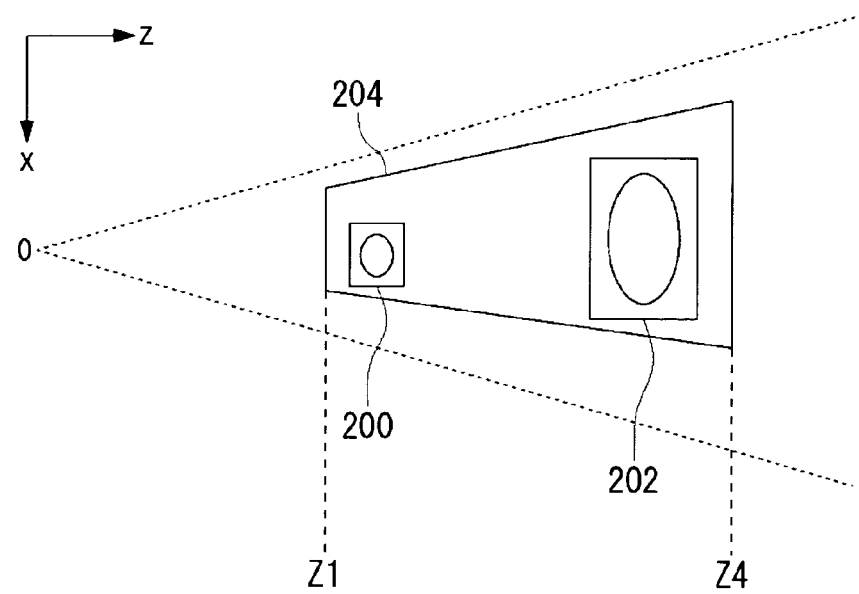

FIG. 17A is an explanatory diagram showing the two B-boxes 200 and 202 which belong to the same group. The brick 204 was derived to be a subspace which contains the above two B-boxes. FIG. 17B is a top view. The two B-boxes 200 and 202 contain within them, for example, an object moving in three-dimensional space at a high speed (hereafter, "High-speed Object"). Based on their motion characteristics, they are sorted in the same group. In the embodiment described above, as shown in the figure, the brick 204 which is clipped by the front clipping plane located at point Z1 from the viewpoint O and the back clipping plane located at Z2 is derived to be a subspace which contains these two B-boxes 200 and 202.

Figure 18A:
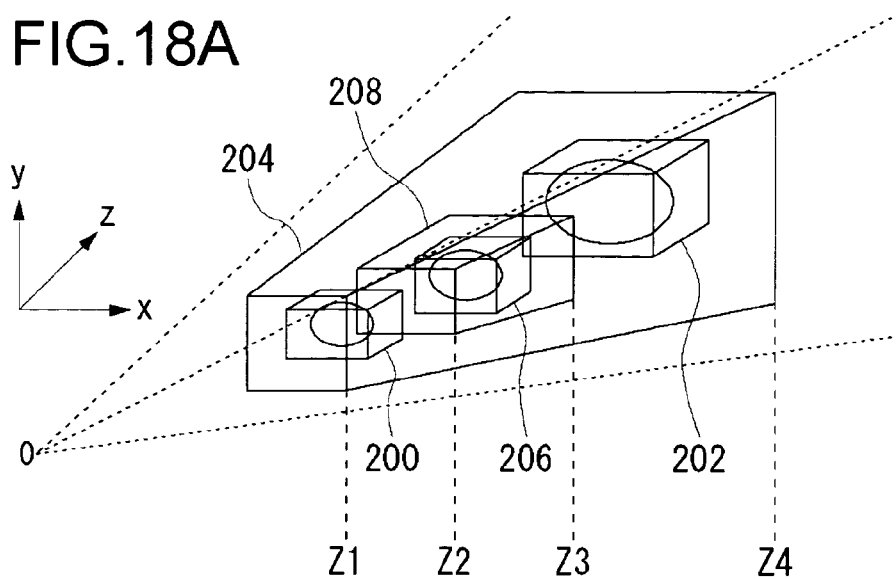
FIG. 18A is an explanatory diagram showing the space division when another B-box comes into the subspace shown in FIGS. 17A and 17B.
Figure 18B:
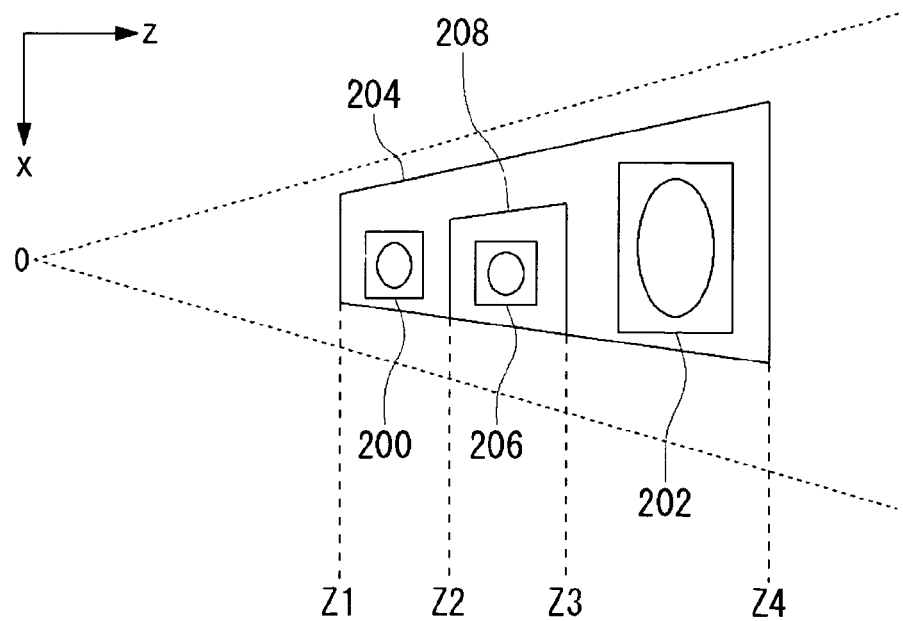
FIG. 18B is a top view.

Consider a situation in which after the brick 204 was determined as shown in FIGS. 17A and 17B and rendering processing proceeded, the B-box 206, which is another B-box containing an object with different motion characteristics, comes into the brick 204. FIG. 18A is an explanatory diagram showing the space division of this new situation and FIG. 18B is a top view. The B-box 206 contains within it, for example, an object moving in three-dimensional space at a low speed (hereafter, "Low-speed Object") and because of the difference in motion characteristics, is sorted in a group different from the two B-boxes 200 and 202 which contain a high-speed object. Therefore, in the embodiment described above, as shown in the figure, the brick 208 which is clipped by the front clipping plane located at point Z2 from the viewpoint O and the back clipping plane located at Z3 is newly derived to be the subspace which contains the B-box 206 with its low-speed object. The brick 208 is overlapped in the z direction by the brick 204 which contains the two B-boxes 200 and 202 which both contain a high-speed object.

Figure 19:
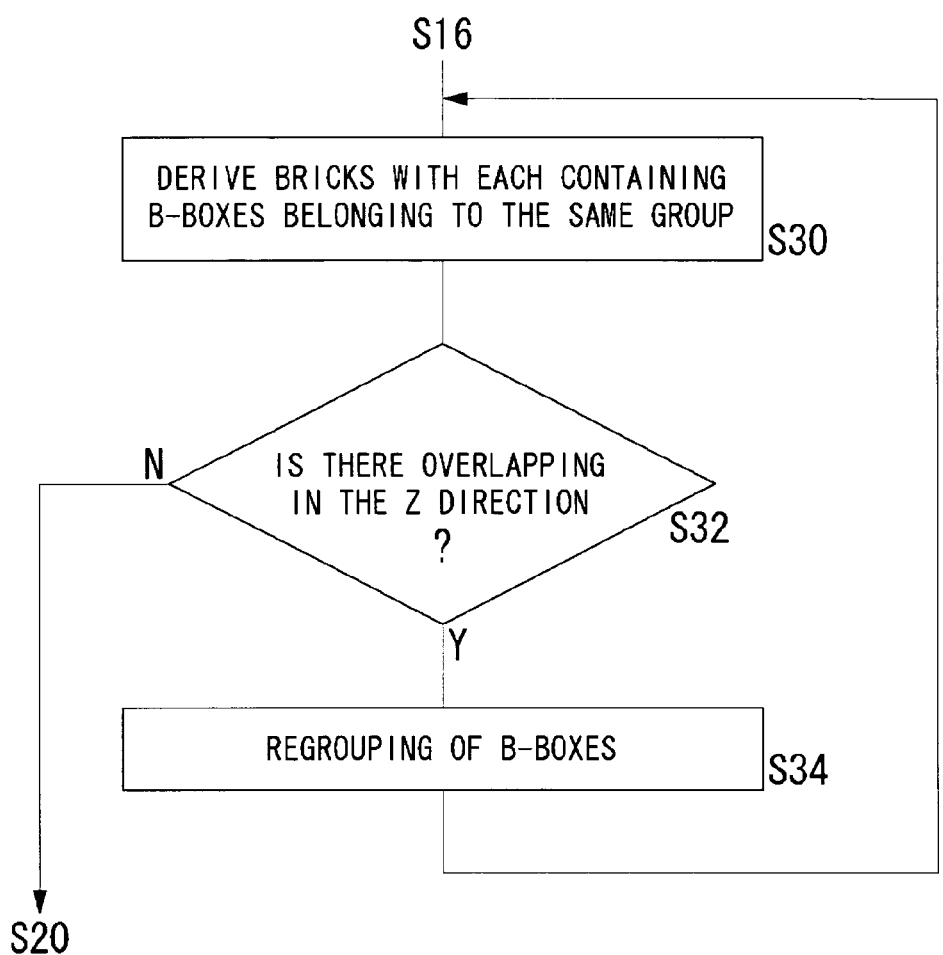
FIG. 19 is a flowchart showing an alteration of the brick deriving procedure of FIG. 9.

Thus, even though there is overlapping in the z direction between bricks, according to the embodiment described above, it is possible to consolidate an image through Z-merge rendering processing after doing rendering processing by divided space. However, in the event that it is not possible to do Z-merge rendering processing due to limited computing performance, or in the event that there is the desire to simplify rendering processing by skipping Z-merge rendering processing, the bricks, which do not overlap one another in the z direction, may be derived by devising a grouping of B-boxes so that Z-merge rendering processing becomes unnecessary. FIG. 19 is a flowchart showing the brick deriving procedure in which overlapping in the z direction can be eliminated. This flowchart is a modification of step S18 in FIG. 9 showing the division rendering processing procedure and consolidation processing procedure. The rest of the procedure up to step S16 and then from step S20 onward is same as in FIG. 9.

In step S16, after the B-boxes are grouped by the grouping unit 44, the bricks in which there are B-boxes belonging to the same group are derived by the rendering processing unit 46 (S30). The rendering processing unit 46 checks to see if those derived bricks overlap one another in the z direction (S32). If there is overlapping in the z direction (Y of S32), the grouping unit 44 regroups the B-boxes so that the overlapping of the bricks in the z direction is eliminated (S34).

Figure 20A:
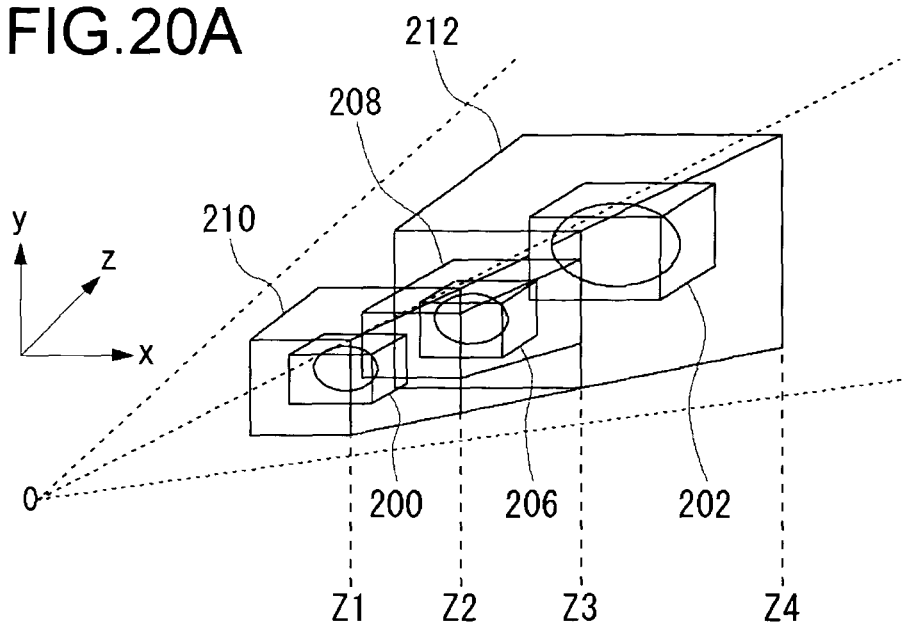
FIG. 20A is another explanatory diagram of bricks in which there are B-boxes shown in FIG. 18.
Figure 20B:
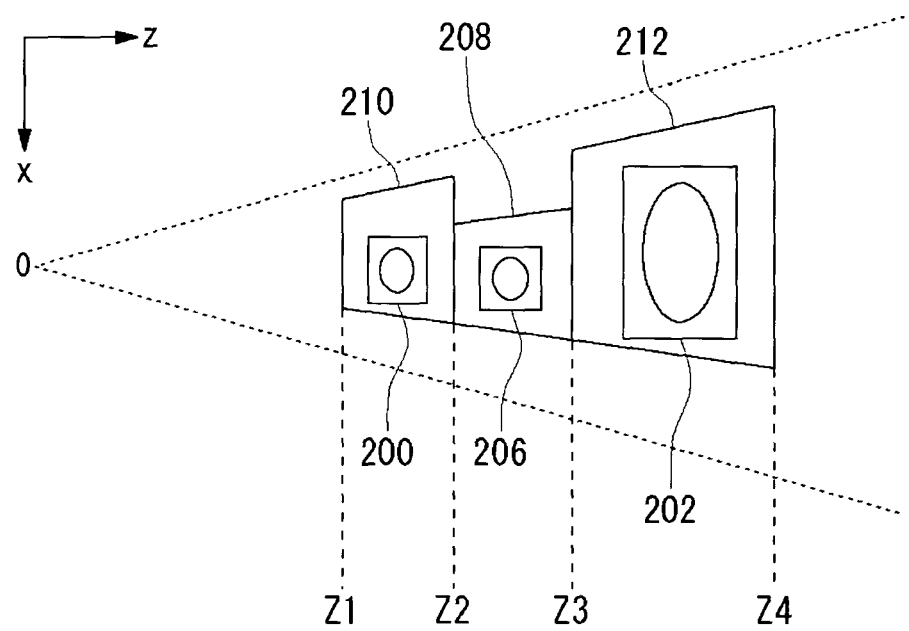
FIG. 20B is a top view.

FIG. 20A is an explanatory diagram showing the regrouping of B-boxes and FIG. 20B is a top view. The two B-boxes 200 and 202 which each contains a high-speed object have so far been sorted to be in the same group, but as was described in FIGS. 18A and 18B, if nothing is done, overlapping in the z direction occurs between bricks. Then, in order to eliminate such overlapping, the grouping unit 44 sorts the two B-boxes 200 and 202 into different groups. As a result, going back to step S30, the rendering processing unit 46 again derives the bricks in which there are B-boxes belonging to the same group. As shown in FIGS. 20A and 20B, the two bricks 210 and 212 are derived and each of them respectively contains the B-box 200 and B-box 202 which belong to different groups. Consequently, overlapping in the z direction with the brick 208 containing the newly added B-box 206 is eliminated. Going back to FIG. 19, when overlapping of bricks in the z direction is eliminated (N of S32), the procedure proceeds to step S20 to do the next division rendering processing and consolidation processing.

Thus, through regrouping, space division without overlapping in the z direction is done and as a result Z-merge rendering processing becomes unnecessary. The necessity of regrouping can be determined when deciding how the rendering processing by brick unit, which is step S20 of FIG. 9, shall be done. In other words, after the space is divided into bricks by the grouping unit 44, the rendering processing unit 46 can determine the complexity levels of rendering processing by brick and based on these levels direct the grouping unit 44 to do regrouping. For example, if the computing cost is expected to be higher than the specified cost, regrouping is directed.

Further, as another example of modification, it is possible to configure a distributed rendering system in which the compute nodes such as personal computers (PC) connected to the network are used as the image processing device 100 according to the embodiment. Rendering processing of the object is done in multiple compute nodes, and image data is consolidated by exchanging image data via the network.

Figure 21:
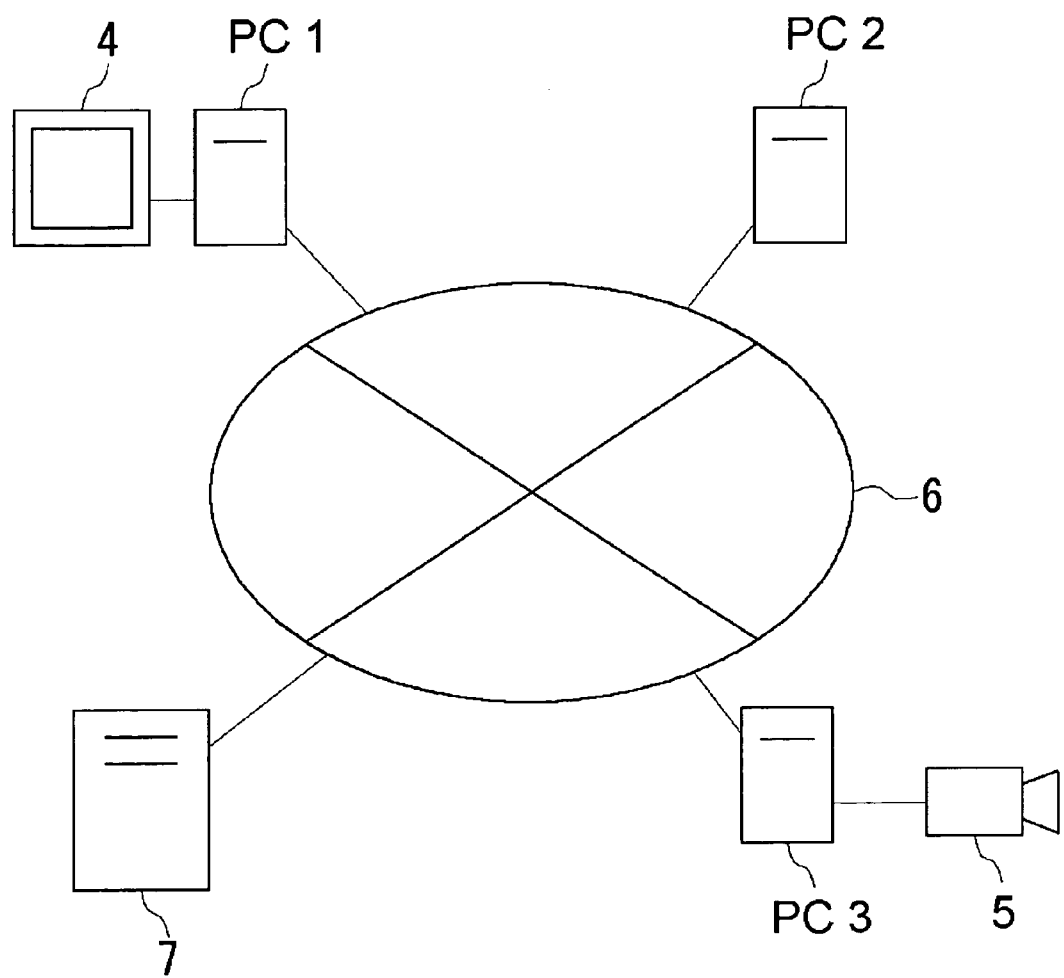
FIG. 21 is an explanatory diagram showing a configuration example of a distributed rendering processing system according to an embodiment of the present invention.

FIG. 21 is an explanatory diagram showing a configuration example of a distributed rendering processing system. Three personal computers PC1-PC3 and the server 7 are connected to the network 6. The server 7 provides the service in the virtual space, which enables users to login and control virtual characters. PC1-PC3 each corresponds to the image processing device 100 according to the embodiment as described above. They communicate with the server 7 and also do rendering processing in the virtual space through the service that the server 7 provides in the virtual space. They also communicate with other PCs and do distributed rendering processing.

In PC1, the user A logs into the virtual space and controls the virtual character C1 within the virtual space, in effect an image in the virtual space seen from the user A's viewpoint is generated. In PC2, the user B logs into the virtual space and controls the virtual character C2, in effect an image in the virtual space seen from the user B's viewpoint is generated. To PC3, a camera 5 is connected, which is capable of attaining information about the distance from the viewpoint together with image information. The image information and distance information of the distant view photographed in wide view angle from the camera 5's s viewpoint is input in PC3 to be processed by rendering processing.

In each of the object storage units 52 of PC1-PC3, a B-box map is stored in which the hierarchy of the objects is determined by making the viewpoint of each respective PC its center based on LOD information. In the B-box map, the upper hierarchy contains information about the objects seen from a farther distance and such objects are rendered with a coarser level of detail. The lower hierarchy contains information about the objects seen from a closer distance and such objects are rendered with a finer level of detail. Data of the objects in a B-box map is controlled respectively at the individual PC and server. The B-box map includes the address of the PC or server which controls the individual objects. A B-box map is renewed according to the movement of the user's viewpoint. For example, if the user's viewpoint recedes, it becomes a B-box map with a more distant view and if the user's viewpoint draws closer, it becomes a B-box map with a closer view. PC1-PC3 each does rendering processing of objects based on their B-box map and they exchange generated image data according to need.

PC1 transmits to PC2 and PC3 via the network 6 information related to the viewpoint while the user A observes the virtual space. Each of the rendering processing units 46 of PC2 and PC3 generates image data through rendering processing of the virtual character C2 and the distant view observed from the user A's viewpoint and transmit the data to PC1. The consolidation unit 48 of PC1 merges the image data of the virtual character C2 and the distant view, which were received from PC2 and PC3, and the image data of the virtual character C1 generated through rendering processing in PC1. Then, it stores the merged data in the image storage unit 54. The display unit 50 of PC1 reads out the merged image data from the image storage unit 54 and displays it on the display 4.

At this point, if the user A's virtual character C1 and the user B's virtual character C2 are close together, interferences such as overlapping of the objects and mutual interaction will occur. Therefore, between PC1 and PC2, in addition to the viewpoint information, three-dimensional object data are exchanged to do rendering processing of the interfered part.

Further, since the user B's virtual character C2 does not always exist within the user A's view, PC2 transmits the image data of the virtual character C2 to PC1 only when the virtual character C2 comes into the user A's view. When PC1 grasps the positional information of the virtual character C2, it transmits the user A's viewpoint information to PC2 only when the virtual character C2 comes into the user A's view. Then, PC2 generates the rendering data of the virtual character C2 seen from the user A's viewpoint and transmits it to PC1.

When PC1 does not grasp the positional information of the virtual character C2, it continuously transmits the user A's viewpoint information to PC2. Based on this viewpoint information, PC2 judges whether or not the virtual character C2 exists within the user A's view and only when it does, generates rendering data of the virtual character C2 seen from the user A's viewpoint, and transmits it to PC1. If the virtual character C1 and virtual character C2 have little probability of interfering with each other, it is possible to take a long time interval for mutual communication between PC1 and PC2 such as exchanging viewpoint information and three-dimensional object data. The degree of such interference is determined based on the size of B-box containing an object and the distance between B-boxes. Further, a server or PC of a third person may be set up so that it will monitor the user A's viewpoint information in PC1 and the position information of the virtual character C2.

Figure 22:
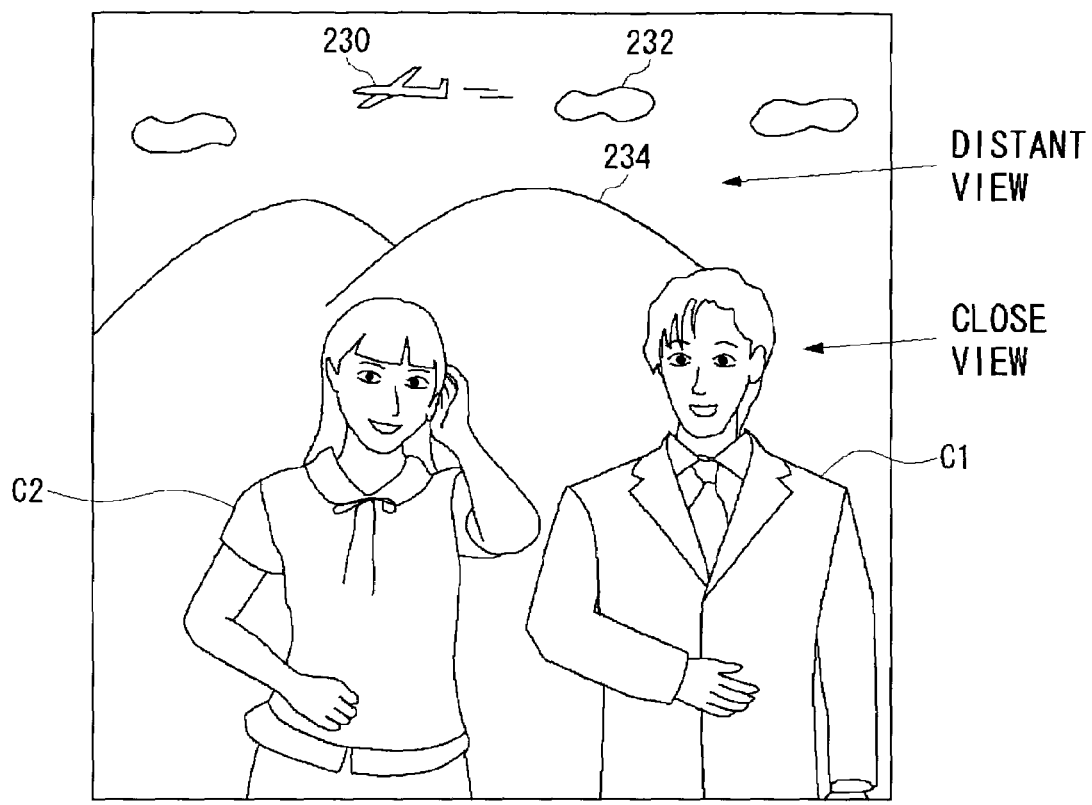
FIG. 22 shows an example of an image to be displayed on a display of the PC shown in FIG. 21.

FIG. 22 shows an example of an image to be displayed on the display 4 of PC1 shown in FIG. 21. In the distant view, a static object like the mountains 234 and dynamic objects like the clouds 232 and airplane 230 are displayed. This distant view is the image data of a picture photographed by the camera 5 of PC3, which was generated through rendering processing based on the viewpoint information of the user A of PC1. In the close view, the virtual character C1 controlled by PC1 and virtual character C2 controlled by PC2 are displayed. The virtual characters C1 and C2 are the image data which were generated through rendering processing respectively in PC1 and PC2.

Figure 23A:
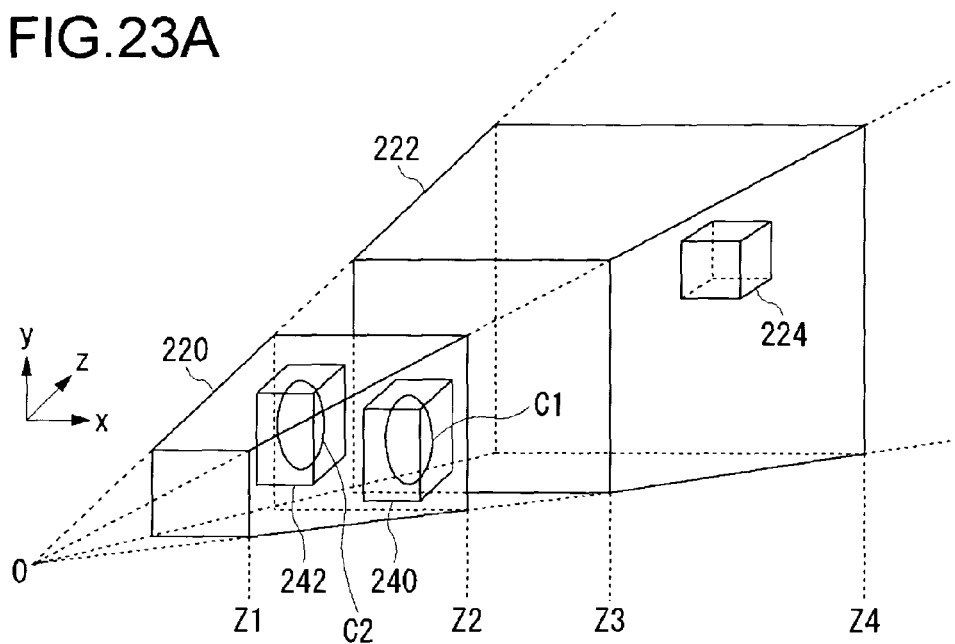
FIG. 23A is an explanatory diagram of bricks which contain the objects shown in FIG. 22.
Figure 23B:
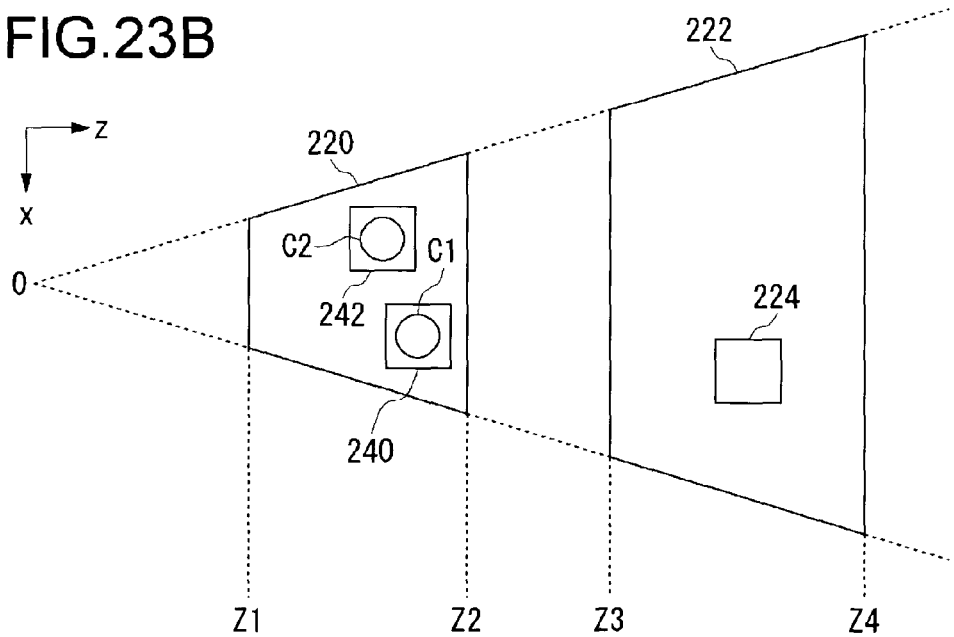
FIG. 23B is a top view.

FIG. 23A is an explanatory diagram showing bricks derived by the rendering processing unit 46 of PC1 and FIG. 23B is a top view. The rendering processing unit 46 of PC1 sorts the two virtual characters C1 and C2 in FIG. 22 into the same group based on LOD information and object characteristics. Then, since the two virtual characters C1 and C2 are close together, while giving consideration to the degree of interference between these characters, it derives the subspace containing the B-boxes 230 and 232 with these objects to be a rendering unit for the close view. In other words, as seen in the figure, the brick 220 clipped by the front clipping plane located at point Z1 from the viewpoint O and the back clipping plane located at Z2 is derived.

The consolidation unit 48 of PC1 receives object data of the virtual character C2 in real time from PC2 and does rendering processing in the brick 220 while giving consideration to the area in which the virtual character C1 and virtual character C2 interfere with each other to generate the final image data of the brick 220.

Further, the rendering processing unit 46 of PC1 derives the brick to be the rendering unit for the distant view. The mountains 234, clouds 232, and airplane 230 in FIG. 22 are the objects to be combined into the distant view. They have similar LOD but as for their motion characteristics, the mountains 234 which is a static object and the clouds 232 which is a low-speed object are different from the airplane 230 which is a high-speed object. Therefore, the rendering processing unit 46 sorts the airplane 230 into a group which is different from the group for the mountains 234 and clouds 232. Thus, the objects in the distant view are sorted into 2 groups. Then, the subspace containing the B-box with the object belonging to one group and the subspace containing B-boxes with the objects belonging to another group are derived to be the rendering units for the distant view. In other words, as shown in the figure, the brick 222 clipped by the front clipping plane located at point Z3 from the viewpoint O and the back clipping plane located at Z4, and the brick 224 which is another rendering unit inside the brick 222 are derived. The brick 222 mentioned first is a subspace which contains the B-boxes with the mountains 234 and clouds 232, and the brick 224 mentioned second is a subspace which contains the B-box with the airplane 230.

The consolidation unit 48 of PC1 receives image data of the bricks 222 and 224 for the distant view, which are generated by the rendering processing unit 46 of PC3. Then, it consolidates the received data with the image data of the brick 220 for the close view to generate the final image to be displayed. The image data of the distant view attained from PC3 does not necessarily have to be a three-dimensional graphics data, but it may also be a two-dimensional graphics data such as JPEG (Joint Photographic Experts Group). In such cases, the consolidation unit 48 of PC1 simply fits the image data of the brick 220 for the close view into the two-dimensional background image.

At this point, the rendering processing unit 46 of PC3 needs to frequently renew the image data of the brick 224 for the distant view with a high-speed object according to the speed of movement of the object and keep transmitting such renewed image data to PC1. On the other hand, it does not need to renew and transmit to PC1 so frequently the image data of the brick 222 for the distant view with a static object and low-speed object. In addition, after the high-speed object has passed by, the brick 222 with a static object and low-speed object becomes the only brick for the distant view so the time interval for data transmission from PC3 to PC1 can be made longer. Therefore, between the compute node to render the distant view and compute node to render the close view, even if the communication latency is long, the overall distributed rendering processing system will function satisfactorily.

Figure 24A:
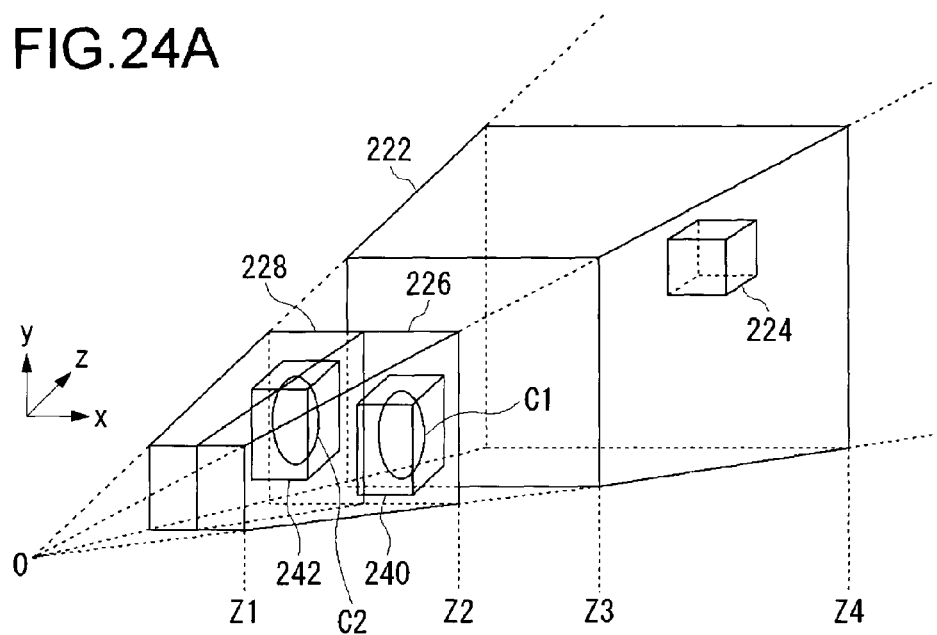
FIG. 24A is an explanatory diagram of bricks which contain the objects shown in FIG. 22.
Figure 24B:
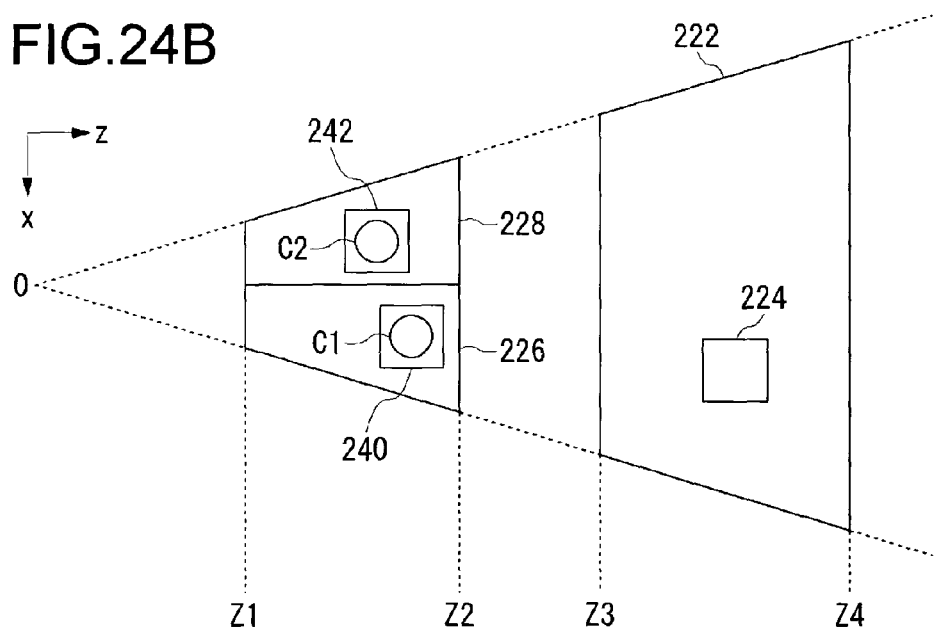
FIG. 24B is a top view.

When there is no interference between the two virtual characters C1 and C2, the rendering processing unit 46 of PC1 derives subspaces, one containing the virtual character C1 and another containing the virtual character C2, to be the rendering units. In other words, as shown in FIGS. 24A and 24B, the brick 226 containing the B-box 240 with the virtual character C1 and the brick 228 containing the B-box 242 with the virtual character C2 are derived.

In this case, the consolidation unit 48 of PC1 receives in real time the image data of the brick 228 with the virtual character C2, which is generated by the rendering processing unit 46 of PC2. Then, it consolidates the received data with the image data of the brick 226 with the virtual character C1 to generate the image data for the close view.

Thus, through dividing the virtual space seen by the user A of PC1 into a brick for the close view and a brick for the distant view, or dividing into bricks based on the object natures such as motion characteristics, it is possible to do distributed rendering processing with a rendering stratagem plotted flexibly per brick, for example, implementing rendering processing in the multiple compute nodes according to the LOD requirement specification for each brick or changing communication frequency between compute nodes.

In the present invention, it is possible to select a rendering strategy independently by brick and reduce the rendering algorithm switching cost by defining the rendering algorithm by brick unit according to object characteristics and LOD requested specifications. In other words, by extracting a subspace to be a brick, to which a uniform rendering strategy may be applied, it is possible to speed up rendering processing through limiting programs and data types necessary within the brick and improve memory usability through allocating a memory region with a size suitable for the rendering algorithm. That is, by using bricks, it is possible to increase the freedom of rendering strategy and at the same time, increase calculation efficiency and memory efficiency, which will be further described with some specific examples.

Figure 25A:
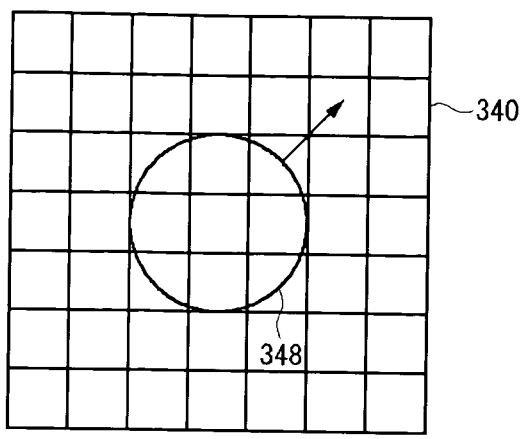
FIGS. 25A-25C are explanatory diagrams of selection of a memory region when doing motion blurring processing for a moving object.
Figure 25B:
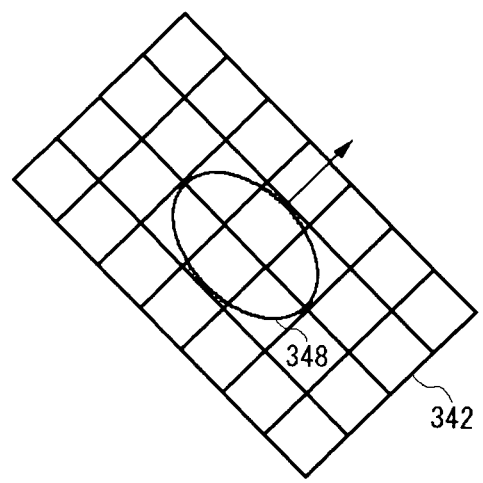
Figure 25C:
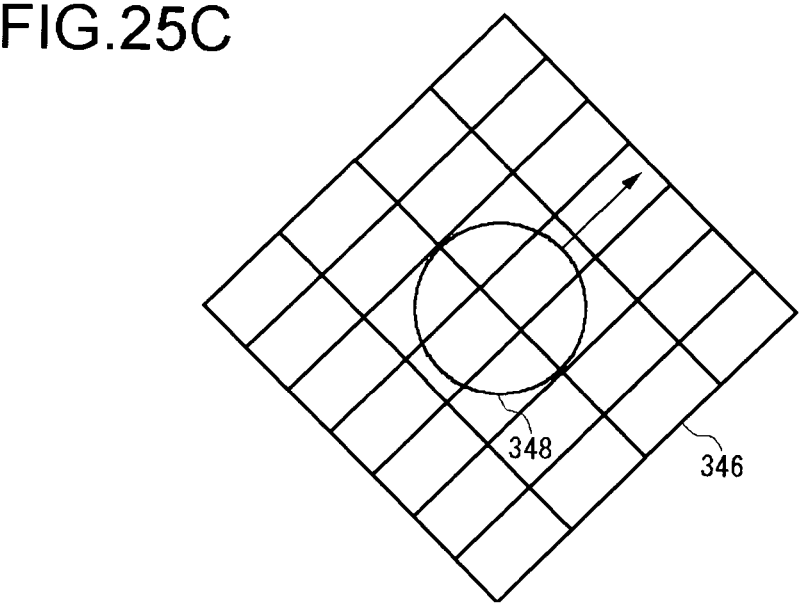

FIGS. 25A-25C are explanatory diagrams of selection of a memory region when doing motion blurring processing for the moving object 348. In the figures, the direction of movement of the moving object 348 is indicated with an arrow. Ordinarily, as shown in FIG. 25A, the rendering area 340 is allocated. However, for doing rendering processing of a brick containing the moving object 348, the rendering processing unit 46 does rendering processing as shown in FIG. 25B by allocating the rendering area 342, which has been compressed in the direction of velocity vector of the moving object 348, to the memory and reducing the resolution in the direction of velocity vector. When consolidating into a final output image, the consolidation unit 48 elongates the rendering area 346 in the direction of velocity vector as shown in FIG. 25C. Since a high resolution is not necessary in the direction of velocity vector of the moving object 348, by selecting the rendering area 342, which has been compressed in the direction of velocity vector, for the brick containing the moving object 348, it is possible to reduce the calculation volume and memory volume for rendering processing of said brick and speed up rendering processing.

Figure 26A:
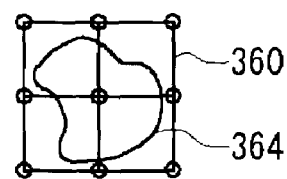
FIGS. 26A and 26B are explanatory diagrams of selection of a memory region when doing defocus processing.
Figure 26B:
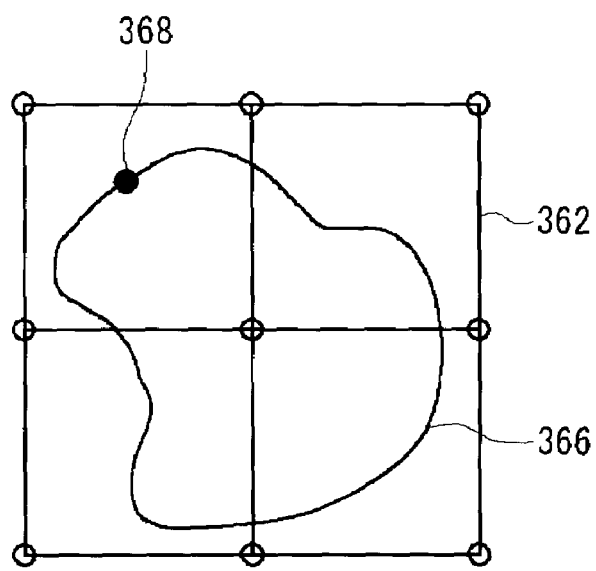

FIGS. 26A and 26B are explanatory diagrams of selection of a memory region when doing defocus processing. As shown in FIG. 26A, for the brick containing an object to be defocused, the rendering processing unit 46 does rendering processing by allotting the low-resolution rendering area 360 and generates the rendering data 364 of the object. When consolidating into a final output image, as shown in FIG. 26B, the consolidation unit 48 expands the rendering area 362 and generates the rendering data 366 of the object by interpolation. For example, the pixel value at the point 368 is calculated by interpolation, such as bicubic interpolation, using the pixel value of grid points surrounding said point in the rendering area 362. Thus, since rendering of an object to be processed by defocus processing does not require high resolution, for the brick containing an object to undergo defocus processing, the low-resolution rendering area 360 is selected. Since resolution of a rendering area is adjusted to an appropriate level according to the focus depth for each brick, it is possible to avoid excessive calculations and memory accesses and speed up rendering processing.

As described above, through doing multi-resolution rendering by appropriately selecting a resolution for each brick according to the characteristics such as an object's speed of movement, etc. and LOD requested specifications, it is possible to optimize rendering processing in regards to both calculation volume and memory volume.

As another example of rendering strategy by brick unit, when a brick is not overlapped by another brick in the z direction and contains only one convex object, Z-merge rendering processing is not necessary for such a brick, and the rendering processing unit 46 can do rendering processing of this brick without using Z-buffer. As a result, it is possible to avoid latency due to Z-value referencing and speed up rendering processing. Instead of using homogeneous resolution Z-buffer for the entire rendering space, changing Z-buffer resolution by brick, or as shown in this example, rendering without using Z-buffer at all can be considered as a method of multi-resolution rendering.

Also, rendering processing by brick unit can be effectively applied for Z-culling processing. It increases the freedom of Z-culling processing by adjusting the Z-culling processing strategy by brick unit and improves processing efficiency. In the following, Z-culling processing by brick unit will be described by referencing FIGS. 27-33.

In the hidden surface removal method by Z-buffer, the depths of objects are compared by pixel unit to determine which object is located in the front. On the other hand, in Z-culling processing, hierarchized Z-buffer is generally used to give a representative Z-value per block unit, which is a group of several pixels, and the depth positions of objects are determined by comparing these per-block Z-values. In Z-culling processing, prior to hidden surface removal by Z-buffer at pixel level, the outward form of an object is approximated in the rectangular region by block unit to grasp the object's depth information at block level and a back object hidden behind the front object is detected in the early stage to omit rendering of that back object.

FIG. 27 is an explanatory diagram of hierarchized Z-buffer used in Z-culling processing. In the figure, a pattern diagram of a three-tier Z-buffer is shown. The 4 pixels 256a-256d of the bottom tier Z-buffer 250 are represented by one pixel 258 of the one upper tier Z-buffer 252. The maximum value among the 4 pixels 256a-256d of the lower tier is set to be the Z-value of this representative pixel 258. Further, in the same way, the 4 pixels of the Z-buffer 252 are represented by the one pixel 259 of the one upper tier Z-buffer.

Thus, in hierarchized Z-buffer, when a tier gets higher, the division unit of the rendering region becomes rougher and for the Z-value for each division unit, the maximum Z-value among the fixed number of pixels; 4 pixels in this case, in the corresponding region of the next lower tier is given. Therefore, in this example, one Z-value of the top tier represents the Z-values of 16 pixels of the bottom tier and data volume is decreased to one-sixteenth. Generally, in Z-buffer method, Z-buffer needs to have a resolution equivalent to that of the screen, therefore, a high-capacity memory is necessary and latency of memory access influences processing time. But, by hierarchizing the Z-buffer, for example, dividing the top Z-buffer into around 256 blocks, Z-value of that Z-buffer can be stored in cache and Z-value can be determined within cache. As a result, reduction of latency due to Z-value referencing and high-speed processing becomes possible.

In order to make Z-culling processing effective, the rendering processing unit 46 makes a processing procedure list by determining the schedule so that rendering processing starts from the brick containing the front object and proceeds in stages to the bricks containing objects located at the back. When the rendering processing unit 46 finishes rendering processing of the front brick, it activates an event, makes hierarchized Z-buffer for said front brick, and transfers data of an upper tier Z-buffer to the consolidation unit 48. The consolidation unit 48 determines the depth positions of objects by comparing Z-value of the upper tier Z-buffer, which has been transferred, and Z-value of the object included in the back brick, which is planned to be processed by rendering processing and judges if rendering processing of the object included in the back brick is necessary.

At the point when rendering processing of multiple front bricks is finished, the rendering processing unit 46 may make hierarchized Z-buffer for these multiple bricks and transfer data of the upper tier Z-buffer of these bricks to the consolidation unit 48. This enables the consolidation unit 48 to do culling of the back object hidden behind multiple front objects. Thus, by adjusting the timing for transferring hierarchized Z-buffer to the consolidation unit 48 by brick unit, the rendering processing unit 46 can explicitly determine the timing for doing culling processing so that culling processing of the back brick is done after rendering processing of a certain number of front bricks has been finished. Further, the rendering processing unit 46 can also specify which front brick shall be used to do culling of which back brick, by selecting front bricks to be used for culling processing, for example, selecting only the front bricks containing a relatively large sized object and transferring hierarchized Z-buffer of the selected front bricks to the consolidation unit 48. Thus, by explicitly determining culling processing strategy by brick unit, it is possible to increase flexibility of culling processing.

Figure 28:
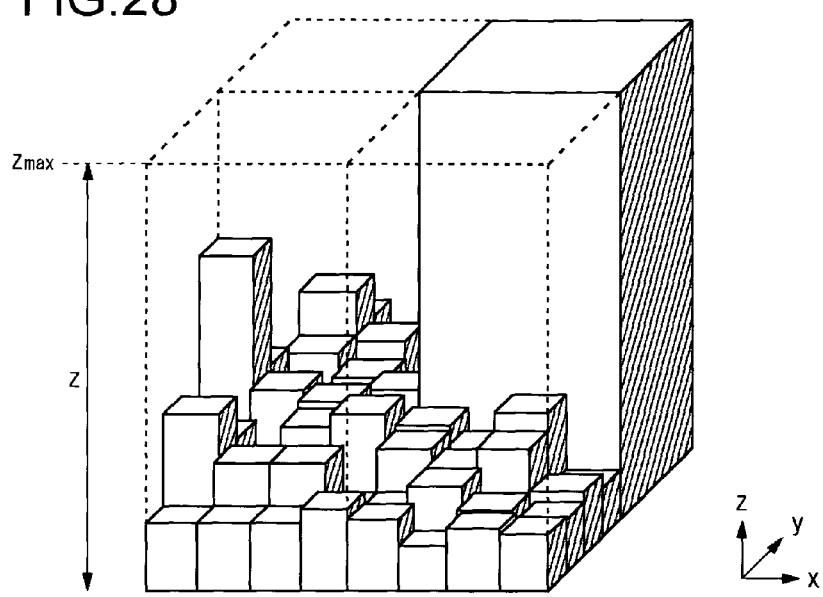
FIG. 28 is an explanatory diagram showing Z-value of the bottom tier Z-buffer of FIG. 27.
Figure 29:
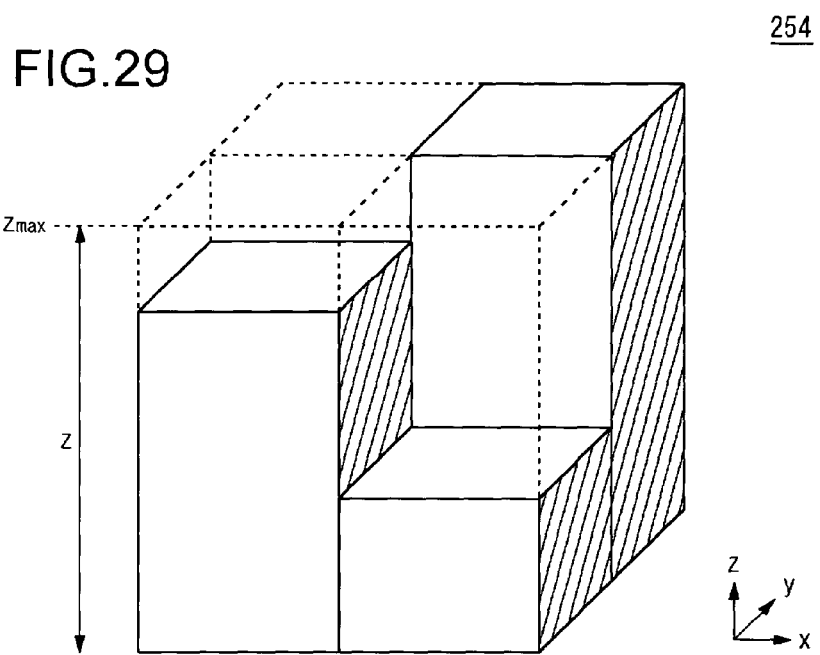
FIG. 29 is an explanatory diagram showing Z-value of the top tier Z-buffer of FIG. 27.

FIG. 28 and FIG. 29 are explanatory diagrams each showing Z-value of the bottom tier Z-buffer 250 and Z-value of the top tier Z-buffer 254, as shown in FIG. 27. Z-value as shown in FIG. 28 is the depth locally specified within the brick to be processed by the rendering processing unit 46. The closer the object, the smaller the Z-value is and when the object is in most forefront location, its Z-value is zero. In the Z-buffer method, Z-value is initialized by the maximum value $z_{max}$, and Z-value for the most forefront object of each pixel is calculated to be the final Z-value of each pixel. Therefore, if there is a pixel whose calculated Z-value stays the same as the maximum value $z_{max}$, it means that there is no object projected in this pixel. Z-value of each block resulting from quarterly division of the top tier Z-buffer 254 in FIG. 29 is given by the maximum Z-value among the 16 pixels corresponding to each block of the bottom tier Z-buffer 250 in FIG. 28. In addition, it may be stated that the closer an object, the higher the Z-value is and the further an object, the lower the Z-value is. By using such a definition, the subsequent Z-culling processing will make no essential difference.

FIG. 30 is an explanatory diagram of Z-culling processing in the consolidation unit 48. When the consolidation unit 48 receives the value of the top tier Z-buffer 254 as shown in FIG. 29 from the rendering processing unit 46, it corrects it to be the absolute Z-value in the original space by adjusting the dynamic range of Z-value. The figure shows the relationship between the corrected Z-value of each block resulting from quarterly division of the Z-buffer 290 and the two back objects 280 and 282 to be processed by rendering processing.

A Z-culling condition to be determined by the consolidation unit 48 is that the minimum Z-values of the back objects 280 and 282 shall be higher than Z-value of the Z-buffer 290. Z-value of the Z-buffer 290 is the maximum Z-value of the front object in the corresponding block. Therefore, when the above culling condition is satisfied, the back objects 280 and 282 are hidden behind the front object and invisible. For example, the minimum Z-value of the first back object 280 is higher than Z-value of the first block 270 of the Z-buffer 290, which satisfies Z-culling condition, therefore the first back object 280 is hidden behind the front object within the first block 270 and invisible. In the same way, the second back object 282 satisfies Z-culling condition and is hidden behind the front object within the second block 272 and invisible. On the other hand, since Z-value of the third block 276 takes the maximum value $Z_{max}$, even if there is a back object within this block, the Z-culling condition described above is not satisfied. This means that since there is no front object within the third block 276, the back object within this block can be seen from the viewpoint. The consolidation unit 48 does culling of the first back object 280 and second back object 282, which satisfy Z-culling condition, to omit rendering processing of these objects. Thus, by comparing magnitudes of Z-values by block unit, the case not requiring rendering of the back object can be efficiently judged, so unnecessary rendering can be omitted and the speed of rendering processing can be increased.

Figure 31A:
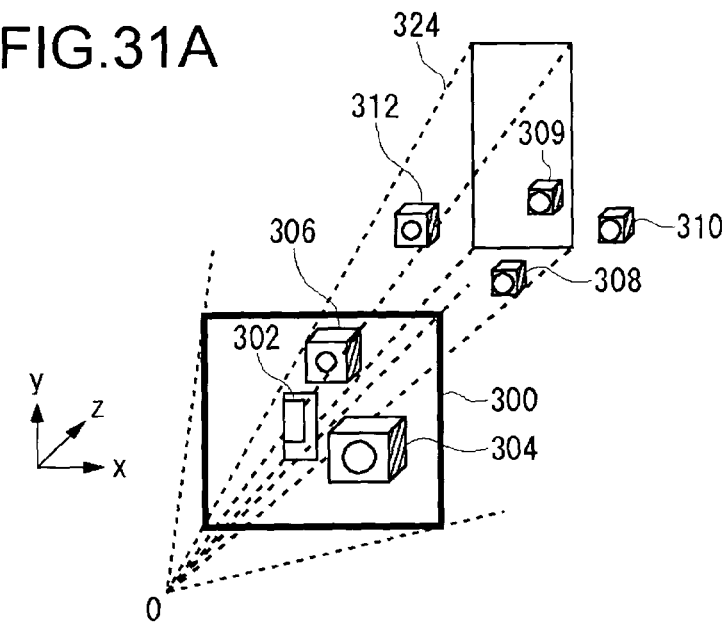
FIGS. 31A and 31B are explanatory diagrams of an example of Z-culling processing.
Figure 31B:
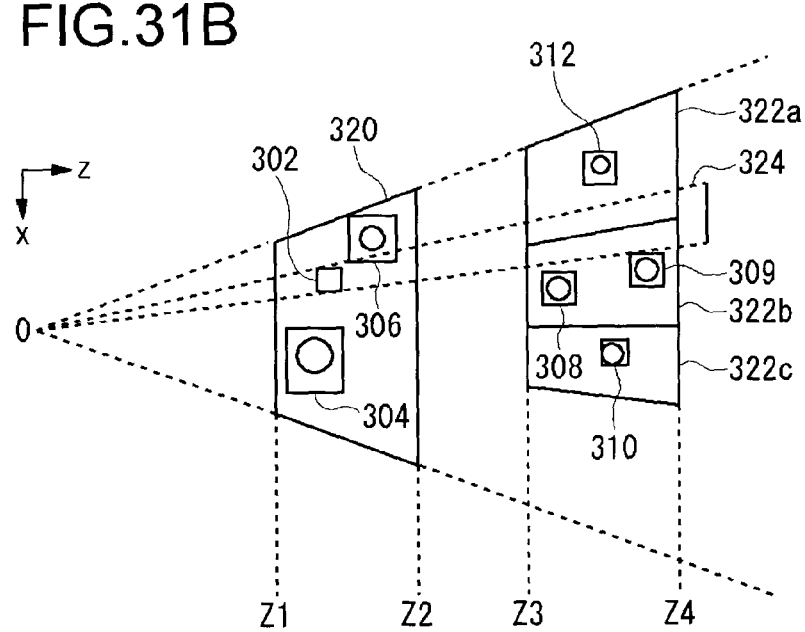

Now, a specific example of culling processing by brick unit shall be described. As shown in FIG. 31A, in the close view seen from the viewpoint O, there are the menu 302 and two B-boxes 304 and 306 and in the distant view, there are the four B-boxes 308, 309, 310, and 312. These objects are projected on the projection plane 300 and rendered. FIG. 31B is a top view of FIG. 31A and as shown in the figure, the three objects 302, 304, and 306 in the close view are within the front brick 320 which is clipped by the front clipping plane located at point Z1 and the back clipping plane located at point Z2. The four objects 308, 309, 310, and 312 in the distant view are within the back bricks 322a, 322b, and 322c resulting from tripartite division (hereinafter may be generically referred to as "back brick 322") which are clipped by the front clipping plane located at point Z3 and the back clipping plane located at point Z4.

Rendering processing is scheduled in the order from the front brick 320 to the back brick 322 and after doing rendering processing of the front brick 320, information of the upper tier Z-buffer of the hierarchized Z-buffer of the front brick 320 is used when doing rendering processing of the back brick 322. Thus, culling is done for an object or brick, which does not require rendering processing.

Figure 32A:
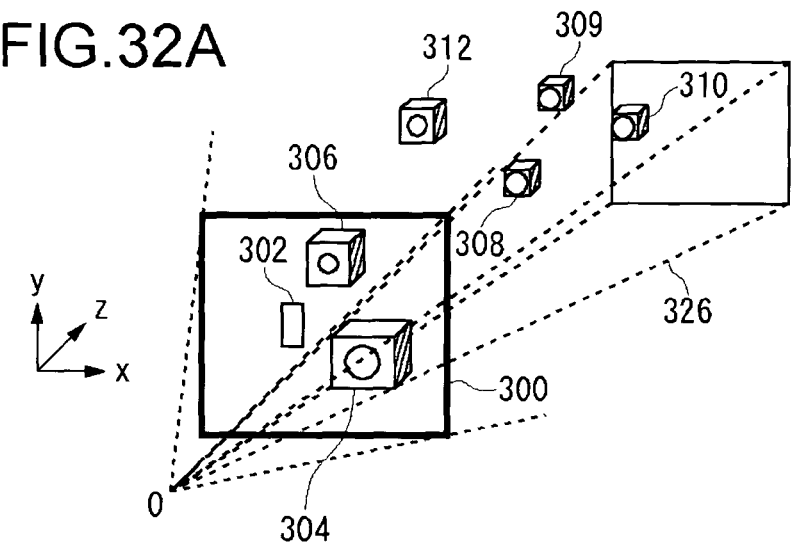
FIGS. 32A and 32B are explanatory diagrams of an example of Z-culling processing.
Figure 32B:
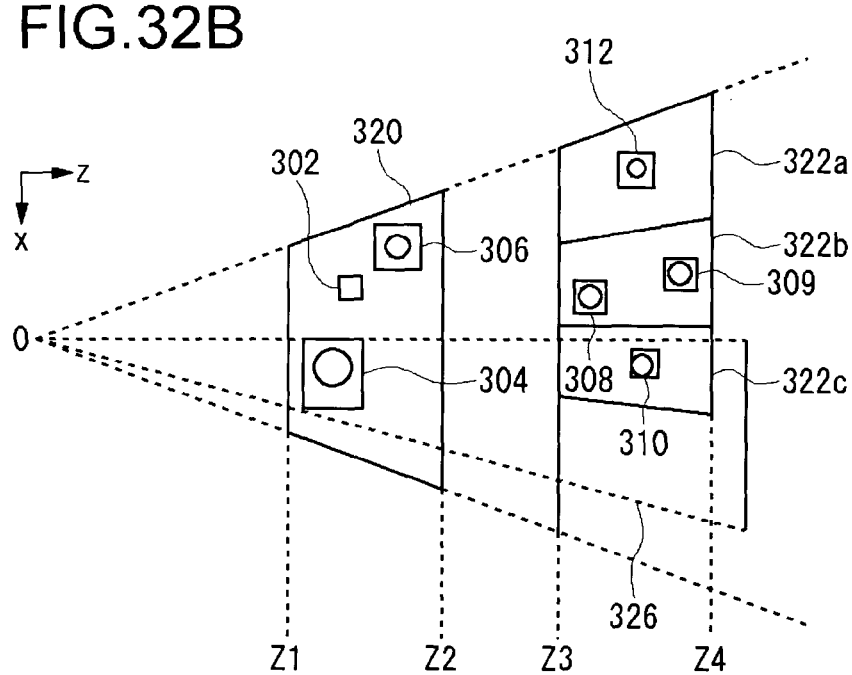
Figure 33A:
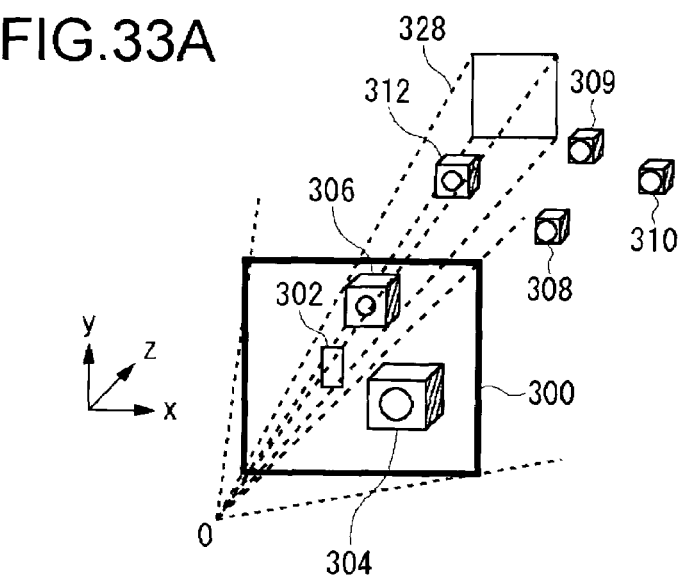
FIGS. 33A and 33B are explanatory diagrams of an example of Z-culling processing.
Figure 33B:
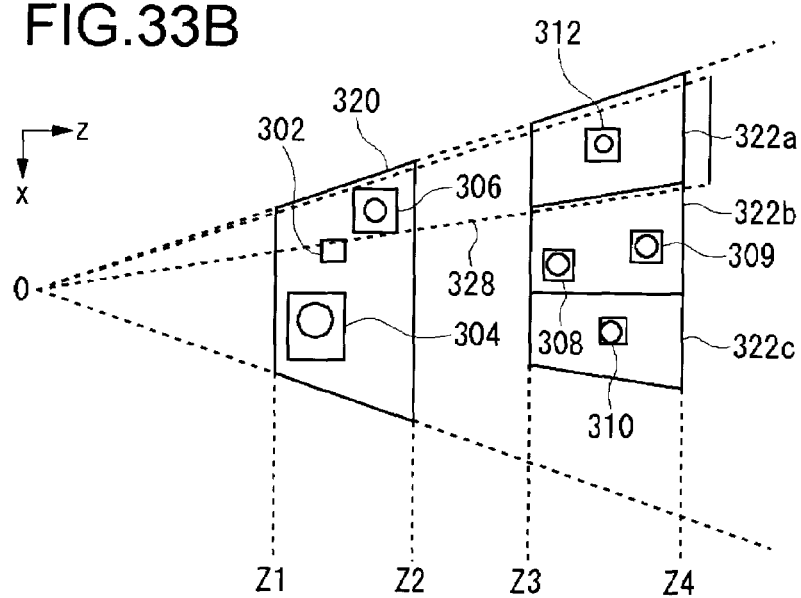

As shown in FIGS. 31A and 31B, the view volume 324 when seeing the menu 320 from the viewpoint O does not include any of the B-boxes 308, 309, 310, 312 in the distant view. On the other hand, as shown in FIGS. 32A and 32B, in the view volume 326 for the B-box 304 in the close view, the B-box 310 in the distant view is included. Also, as shown in FIGS. 33A and 33B, in the view volume 328 for the B-box 306 in the close view, the other B-box 312 in the distant view is included. As a result, these two B-boxes 310 and 312 in the distant view are subject to culling and as for the two back bricks 322a and 322c which respectively include the B-box 310 and B-box 312, rendering processing is not done.

So far, an example of culling of an entire brick was described, but also the B-boxes within a brick may be individually culled. For example, if the back brick 322 is not divided into three parts, but there is one brick, instead of doing culling of the entire brick, after the two B-boxes 310 and 312 in the distant view within the brick are individually culled and become not subject to rendering processing, the remaining B-boxes 308 and 309 are processed by rendering processing. Further, culling processing may be done at the polygon model level of an object within a B-box, as well as doing it at the B-box level. According to the object characteristics within a brick and CPU performance and memory capacity of the rendering unit to process the brick, either culling at the B-box level or at the polygon level may be selected. Thus, it is possible to optimize the culling processing strategy by brick.

Furthermore, as another example of rendering strategy, partial ray tracing may be adopted, in which a different hidden surface removal method is used for each brick, for example, for a brick in the close view, ray tracing, which requires complicated calculations, is applied locally and for other outside bricks, reflection mapping is used. In reflection mapping, a large virtual sphere or virtual cube is placed around the object to be rendered and the environmental texture is pasted on its inner wall in advance. Then, an intersecting point where the object intersects the visual line is calculated and further, by stretching the reflection vector from that point, an intersecting point with the virtual sphere or virtual cube is calculated. The color of the virtual sphere or virtual cube at that intersecting point shall be mapped as the color of the object. In both ray tracing and reflection mapping, if the environmental information is extended for an infinite distance, the calculation volume increases and memory efficiency becomes less. Therefore, the environmental data necessary for rendering may be narrowed down by limiting the environment by brick unit. A system may be configured so that exchange of data mutually necessary between bricks is possible, which enables receiving of environmental data necessary for rendering from another brick. In such a system, the levels of details of environmental data received from other bricks may be differentiated, for example, from a brick being close to the brick to be rendered, object data is received and from a distant brick, image data is received.

What is claimed is:

1. An image processing apparatus comprising:
   a grouping unit which selects rendering strategy according to characteristics of input three-dimensional objects and groups the three-dimensional objects into groups in such a manner that the three-dimensional objects to which the same rendering strategy is applied are grouped into the same group;
   a rendering processing unit which derives a three-dimensional subspace which contains the three-dimensional objects belonging to the same group to be an independent rendering unit and performs rendering processing individually on the subspace by applying the group by group different rendering strategy, and generates independent image data for each subspace; and
   a consolidation unit which generates final output image data to be displayed by consolidating the image data generated for each subspace,
   wherein the grouping unit groups the three-dimensional objects into groups in such a manner that the three-dimensional subspaces, each of which contains at least one three-dimensional object belonging to the same group, are allowed to spatially overlap one another, and wherein each of the three-dimensional subspaces is defined by boundaries and the boundaries of the three-dimensional subspaces are allowed to spatially overlap one another.

2. The apparatus of claim 1, wherein the rendering processing unit comprises:
a coordinate transformation unit which derives a subspace which is a quadrangular truncated pyramid through perspective projection and performs perspective transformation of the three-dimensional object; and
a rendering unit which performs individual rendering processing in the quadrangular truncated pyramid.

3. The apparatus of claim 2, wherein the grouping unit, based on motion characteristics of the three-dimensional objects, selects the rendering strategy on whether motion blurring processing is applied or not, and groups the three-dimensional objects to which the motion blurring processing is applied, into the same group.

4. The apparatus of claim 2, wherein the grouping unit, based on information related to level of detail in rendering the three-dimensional objects, selects the rendering strategy in which multi-resolution rendering is applied at a resolution depending on the level of detail, and groups the three-dimensional objects to be rendered at the same resolution into the same group.

5. The apparatus of claim 2, wherein the rendering processing unit comprises a plurality of rendering units and distributes the rendering processing to the plurality of the rendering units according to complexity level of the rendering processing by subspace unit.

6. The apparatus of claim 2, wherein the rendering processing unit comprises a plurality of rendering units with different processing performance and assigns the rendering processing to the plurality of the rendering units, each of which has the appropriate processing performance corresponding to complexity level of the rendering processing by subspace unit.

7. The apparatus of claim 2, further comprising a communication unit which receives image data rendered by subspace unit from an external distributed rendering processing device connected with the apparatus via a network, and wherein the consolidation unit consolidates the image data received from the external distributed rendering processing device with the image data generated by the rendering processing unit and generates the final output image data to be displayed.

8. The apparatus of claim 7, wherein the rendering processing is assigned to a plurality of the distributed rendering devices, each of which has different network distance corresponding to level of detail in rendering by subspace unit.

9. The apparatus of claim 2, wherein the grouping unit, based on information related to level of detail in rendering the three-dimensional objects, selects the rendering strategy in which defocus processing is applied at a focus depth depending on the level of detail, and groups the three-dimensional objects to which the defocus processing is applied at the same focus depth, into the same group.

10. The apparatus of claim 1, wherein the grouping unit, based on motion characteristics of the three-dimensional objects, selects the rendering strategy on whether motion blurring processing is applied or not, and groups the three-dimensional objects to which the motion blurring processing is applied, into the same group.

11. The apparatus of claim 1, wherein the grouping unit, based on information related to level of detail in rendering the three-dimensional objects, selects the rendering strategy in which multi-resolution rendering is applied at a resolution depending on the level of detail, and groups the three-dimensional objects to be rendered at the same resolution into the same group.

12. The apparatus of claim 1, wherein the rendering processing unit comprises a plurality of rendering units and distributes the rendering processing to the plurality of the rendering units according to complexity level of the rendering processing by subspace unit.

13. The apparatus of claim 1, wherein the rendering processing unit comprises a plurality of rendering units with different processing performance and assigns the rendering processing to the plurality of the rendering units, each of which has the appropriate processing performance corresponding to complexity level of the rendering processing by subspace unit.

14. The apparatus of claim 1, further comprising a communication unit which receives image data rendered by subspace unit from an external distributed rendering processing device connected with the apparatus via a network, and wherein the consolidation unit consolidates the image data received from the external distributed rendering processing device with the image data generated by the rendering processing unit and generates the final output image data to be displayed.

15. The apparatus of claim 14, wherein the rendering processing is assigned to a plurality of the distributed rendering devices, each of which has different network distance corresponding to level of detail in rendering by subspace unit.

16. The apparatus of claim 1, wherein the rendering strategy is a rendering algorithm applied to the three-dimensional objects.

17. The apparatus of claim 16, wherein the rendering algorithm is a hidden surface removal algorithm.

18. The apparatus of claim 16, wherein the rendering algorithm is a shading algorithm.

19. The apparatus of claim 1, wherein the grouping unit, based on information related to level of detail in rendering the three-dimensional objects, selects the rendering strategy in which defocus processing is applied at a focus depth depending on the level of detail, and groups the three-dimensional objects to which the defocus processing is applied at the same focus depth, into the same group.

20. An image processing system including a plurality of image processing apparatus for exchanging information with each other via a network and performing distributed rendering processing, the system comprising:
a grouping unit which selects rendering strategy according to characteristics of input three-dimensional objects and groups the three-dimensional objects into groups in such a manner that the three-dimensional objects to which the same rendering strategy is applied are grouped into the same group;
a rendering processing unit which derives a three-dimensional subspace which contains the three-dimensional objects belonging to the same group to be an independent rendering unit and performs rendering processing individually on the subspace by applying the group by group different rendering strategy, and generates independent image data for each subspace; and
a consolidation unit which generates final output image to be displayed by consolidating the image data generated for each subspace,
wherein the grouping unit groups the three-dimensional objects into groups in such a manner that the three-dimensional subspaces, each of which contains at least one three-dimensional object belonging to the same group, are allowed to spatially overlap one another, wherein each of the three-dimensional subspaces is defined by boundaries and the boundaries of the three-dimensional subspaces are allowed to spatially overlap one another, and wherein the grouping unit, the rendering processing unit and the consolidation unit are functionally distributed among the plurality of the image processing apparatus.

21. An image processing apparatus for exchanging information with other apparatus via a network, comprising at least one of function blocks of:

a grouping unit which selects rendering strategy according to characteristics of input three-dimensional objects and groups the three-dimensional objects into groups in such a manner that the three-dimensional objects to which the same rendering strategy is applied are grouped into the same group;

a rendering processing unit which derives a three-dimensional subspace which contains the three-dimensional objects belonging to the same group to be an independent rendering unit and performs rendering processing individually on the subspace by applying the group by group different rendering strategy, and generates independent image data for each subspace; and a consolidation unit which generates final output image to be displayed by consolidating the image data generated for each subspace, wherein the grouping unit groups the three-dimensional objects into groups in such a manner that the three-dimensional subspaces, each of which contains at least one three-dimensional object belonging to the same group, are allowed to spatially overlap one another, wherein each of the three-dimensional subspaces is defined by boundaries and the boundaries of the three-dimensional subspaces are allowed to spatially overlap one another, and wherein a processing result by the function block which is not included in this apparatus is received from the other apparatus and utilized.

22. An image processing method comprising grouping a plurality of three-dimensional objects into groups in such a manner that the three-dimensional objects to which same rendering strategy is applied are grouped into the same group and performing rendering processing individually on a subspace which contains at least one three-dimensional object belonging to the same group by applying the group by group different rendering strategy, and generating final image data to be displayed by consolidating rendering data of each subspace, wherein three-dimensional subspaces, each of which contains at least one three-dimensional object belonging to the same group, are allowed to spatially overlap one another, and wherein each of the three-dimensional subspaces is defined by boundaries and the boundaries of the three-dimensional subspaces are allowed to spatially overlap one another.

23. A tangible computer-readable storage medium storing a computer program executable by a computer, the program comprising:

reading array data of a plurality of three-dimensional objects;

selecting rendering strategy according to characteristics of the three-dimensional objects;

grouping the three-dimensional objects which exist in a display area into groups in such a manner that the three-dimensional objects to which the same rendering strategy is applied are grouped into the same group;

deriving a three-dimensional subspace which contains the three-dimensional objects belonging to the same group to be an independent rendering unit;

performing rendering processing individually by subspace unit by applying the group by group different rendering strategy to generate image data for each subspace; and generating final image data to be displayed in the display area by consolidating the image data generated for each subspace, wherein said grouping groups the three-dimensional objects into groups in such a manner that the three-dimensional subspaces, each of which contains at least one three-dimensional object belonging to the same group, are allowed to spatially overlap one another, and wherein each of the three-dimensional subspaces is defined by boundaries and the boundaries of the three-dimensional subspaces are allowed to spatially overlap one another.

24. The storage medium of claim 23, wherein the program further comprises calculating a position of each of the three-dimensional objects in a viewpoint coordinate system and determining information related to level of detail in rendering each of the three-dimensional objects based on a distance from the viewpoint, and wherein said grouping groups the three-dimensional objects which exist in the display area into the groups according to the information related to level of detail.

25. The storage medium of claim 24, wherein the rendering processing are performed in such a manner that the rendering processing for each subspace is distributed to a plurality of rendering processing units.

26. The storage medium of claim 23, wherein the rendering processing are performed in such a manner that the rendering processing for each subspace is distributed to a plurality of rendering processing units.

27. An image processing apparatus comprising:

a grouping unit which selects rendering strategy according to characteristics of input three-dimensional objects and groups the three-dimensional objects into groups in such a manner that the three-dimensional objects to which the same rendering strategy is applied are grouped into the same group;

a rendering processing unit which derives a three-dimensional subspace which contains the three-dimensional objects belonging to the same group to be an independent rendering unit and performs rendering processing individually on the subspace by applying the group by group different rendering strategy, and generates independent image data for each subspace; and a consolidation unit which generates final output image data to be displayed by consolidating the image data generated for each subspace, wherein the grouping unit groups the three-dimensional objects into groups in such a manner that the three-dimensional subspaces, each of which contains at least one three-dimensional object belonging to the same group, are allowed to spatially overlap one another, and wherein the grouping unit groups the intersecting three-dimensional objects, to each of which a different rendering strategy is applied, into the separate groups.

28. An image processing apparatus comprising:

a grouping unit which selects rendering strategy according to characteristics of input three-dimensional objects and groups the three-dimensional objects into groups in such a manner that the three-dimensional objects to which the same rendering strategy is applied are grouped into the same group;

a rendering processing unit which derives a three-dimensional subspace which contains the three-dimensional objects belonging to the same group to be an independent rendering unit and performs rendering processing individually on the subspace by applying the group by group different rendering strategy, and generates independent image data for each subspace; and a consolidation unit which generates final output image data to be displayed by consolidating the image data generated for each subspace, wherein the grouping unit groups the three-dimensional objects into groups in such a manner that the three-dimensional subspaces, each of which contains at least one three-dimensional object belonging to the same group, are allowed to spatially overlap one another, wherein the rendering processing unit generates the independent image data for each subspace, the independent image data having per-pixel Z values indicating depth information on a pixel by pixel basis; and wherein the consolidation unit generates the final output image data to be displayed by performing Z-merge processing of the image data generated for each subspace according to the per-pixel Z values, when three-dimensional subspaces, each of which contains at least one three-dimensional object belonging to the same group, are allowed to spatially overlap one another.

29. The apparatus of claim 28, wherein the consolidation unit corrects dynamic range of a depth value of each pixel of the image data generated for each subspace, and consolidates the image data by comparing the corrected depth value and generates the final output image to be displayed.

30. An image processing apparatus comprising:

a grouping unit which groups input three-dimensional objects into groups;

a rendering processing unit which derives a subspace which contains at least one three-dimensional object belonging to the same group to be an independent rendering unit and performs rendering processing individually on the subspace, and generates independent image data having per-pixel Z values indicating depth information on a pixel by pixel basis for each subspace; and a consolidation unit which generates final output image data to be displayed by consolidating the image data having per-pixel Z values generated for each subspace;

wherein the consolidation unit which generates the final output image data to be displayed by performing Z-merge processing of the image data generated for each subspace according to the per-pixel Z values, when three-dimensional subspaces, each of which contains at least one three-dimensional object belonging to the same group, are allowed to spatially overlap one another.

* * * * *